(12) United States Patent
Chan et al.

(10) Patent No.: US 11,317,991 B2
(45) Date of Patent: May 3, 2022

(54) TEETH ALIGNER SYSTEM

(71) Applicant: Eugene Chan, Zetland (AU)

(72) Inventors: Eugene Chan, Zetland (AU); David Shen, Zetland (AU); Junior Bryan Taurai, Randwick (AU); Matthew James Taylor, Kincumber (AU); Yasmin El Abed, Zetland (AU); Eleanor Hasnip, Zetland (AU); Michael Topham, Zetland (AU)

(73) Assignee: Eugene Chan, Zetland Sydney (AU)

( * ) Notice: Subject to any disclaimer, the term of this patent is extended or adjusted under 35 U.S.C. 154(b) by 213 days.

(21) Appl. No.: 16/321,165

(22) PCT Filed: Jul. 28, 2017

(86) PCT No.: PCT/AU2017/050792
§ 371 (c)(1),
(2) Date: Jan. 28, 2019

(87) PCT Pub. No.: WO2018/018098
PCT Pub. Date: Feb. 1, 2018

(65) Prior Publication Data
US 2019/0159871 A1    May 30, 2019

(30) Foreign Application Priority Data

Jul. 28, 2016  (AU) ................. 2016902974

(51) Int. Cl.
*A61C 7/08* (2006.01)
*A61C 7/00* (2006.01)
*A61C 13/15* (2006.01)

(52) U.S. Cl.
CPC .............. *A61C 7/08* (2013.01); *A61C 7/00* (2013.01); *A61C 19/003* (2013.01)

(58) Field of Classification Search
CPC ........... A61C 7/08; A61C 7/00; A61C 19/003; A61C 19/063; A63B 71/085
USPC .......................................................... 433/6
See application file for complete search history.

(56) References Cited

U.S. PATENT DOCUMENTS

| 5,263,859 A | 11/1993 | Kesling |
| 5,746,594 A | 5/1998 | Jordan et al. |
| 8,747,109 B2 * | 6/2014 | Crivello ................... A61C 5/90 433/37 |

(Continued)

FOREIGN PATENT DOCUMENTS

WO     WO 2006/096558 A2    9/2006

*Primary Examiner* — Nicholas D Lucchesi
*Assistant Examiner* — Mirayda A Aponte
(74) *Attorney, Agent, or Firm* — Reinhart Boerner Van Deuren P.C.

(57) ABSTRACT

A method and apparatus providing orthodontic tooth movement (OTM) using a removable aligner, by providing a shaped removable aligner formed of a thermoplastic and moulded to an OTM fitting shape relative to the teeth of a patient; applying a layer of a gel to an inner surface of a teeth-receiving cavity of the thermoplastic aligner; locating the shaped removable aligner with the applied gel layer in a required OTM fitting position on the teeth of the patient to provide an effective OTM force on the teeth; wherein the gel layer substantially separates and spaces the aligner from the teeth while providing a force transfer mechanism from the aligner to the teeth.

24 Claims, 19 Drawing Sheets

(56) References Cited

U.S. PATENT DOCUMENTS

| | | | |
|---|---|---|---|
| 2002/0051951 A1* | 5/2002 | Chishti | ............... A61C 7/00 433/6 |
| 2012/0225399 A1 | 9/2012 | Teasdale | |
| 2016/0166357 A1 | 6/2016 | Portalupi | |

* cited by examiner

TEETH ALIGNER SYSTEM

FIELD OF THE INVENTION

The present invention relates to an improved teeth realignment system, and in particular to an improved substantially damage free clear orthodontic teeth aligner system for use in removable attachment and force transfer to realign a patients teeth.

In particular, the present invention relates to a substantially damage free teeth aligner system which maintains an orthodontic teeth-aligning device in an attachment position for effective teeth alignment substantially without affecting aesthetics, oral environment including hygiene and teeth enamel.

The invention has been developed primarily for use with removable thermoplastic orthodontic aligners and will be described hereinafter with reference to this application.

BACKGROUND OF THE INVENTION

The desire for teeth that follow a conforming aesthetic and useful functional alignment dates back to ancient times as archaeology finds have revealed human remains including metal bands wrapped around teeth. As orthodontics has evolved over the centuries there has seen the development and evolution of orthodontic treatments for remedying various misalignments, malocclusions and other maxillo-facial related issues.

One approach used early in the 20th century to assist correcting crowded teeth was to selectively extract teeth in order to provide remaining teeth sufficient space to move into a desired position. While the movement of teeth to new positions was always subject to scientific debate, orthodontists aiming to correct misalignments of teeth progressively introduced the use of metal braces in place of extraction.

Metal brace systems generally comprise an arch wire which is wrapped around the arch of treatment, and attached to a posterior molar on each side of the mouth. The arch wires are held to the teeth by brackets attached (bonded) to the enamel of the crown of each tooth. A specific load is applied to the arch wire which is controlled by its engagement with a bracket slot. The purpose of the arch wire/ bonded brackets arrangement of metal braces is to impart force to the teeth to correct any misalignments which exist. Conventionally, such an arrangement required stainless steel bands placed on each individual tooth. Once a normal, balanced occlusion is restored, braces are removed. These are fixed for the duration of treatment and such fixed appliances require regular bracket and wire adjustment or tightening as well as wearing of tight elastics which generate greater sense of pain as well as papillary bleeding sores.

While conventional metal braces have shown to be a functional success, there are numerous clinical limitations. Limitations include time taken for installing the braces, significant patient discomfort, poor access to teeth surfaces for cleaning and flossing, and the braces are fixed on the teeth for the duration of treatment degrading the enamel. Metal bracket attachments and the arch wire often retain food particles. This can easily result in increasing the patients chances of developing a diseased legion in the gingiva affecting the supporting tissues.

Further limitations arise when metal braces are removed from teeth. For example, it is often the case that adhesive used for bonding brackets to teeth remain on the teeth after removal of the brackets. Adhesive remaining on the teeth surface needs to be removed, which can cause damage to the tooth enamel.

A further and important consideration of patients using metal braces is aesthetics. While individuals desire to have aesthetic and functionally conforming teeth general acceptance of metal braces, aesthetics and self-esteem is an increasingly important factor in consideration of treatments for broader community and particularly critical for young adults and adolescents.

One approach which has been used to address the importance of maintaining aesthetics while undergoing teeth realignment has been the introduction of ceramic brackets as an alternative to metal braces. A so-called advantage of ceramic braces is the ability to color match. However, the problems of ceramic braces are exacerbated by the extent of treatment, and the staining by elastomeric bands used to secure wires to slots of the braces. A further drawback of ceramic brackets as with metal braces is that they are not removed from the teeth until treatment is concluded. This fixed treatment again complicates regular tooth care resulting in exposure of teeth to high acid decay environment observed with use of metal braces.

In addition, fixed orthodontic treatments can only apply forces on the labial or lingual surfaces of teeth leading to its controversy surrounding its ability to achieve precision in tooth placement, correction of tooth rotation and effective bodily translation.

A recent advance is the introduction of the so-called :clear or invisible aligner system. Removable Thermoplastic Aligners (RTA s) are an area of preference for improved oral hygiene and aesthetics compared to traditional fixed metal or ceramic bracket systems.

These systems provide orthodontic tooth movement (OTM) using RTA s based on an intentional mis-fit between the aligner and the entire initial dental position. Positioning of the aligner over the teeth produces a force system of stresses and strains in specific locations to gradually move the teeth into the new required configuration.

Patients are given a successive set of custom designed aligners every one to four weeks (depending on specific type of appliance) over a period of up to 1.5 to 2 years. Each successive set comprises new configurations that eventually move the teeth through a series of intermediate configurations to a final desired configuration. The RTA s are usually worn at least 20 hours per day and the patient removes them to eat, floss and brush.

Primarily these systems do not use adhesives but a close misfit between the aligner and the entire initial dental position. The result is that there is a tight grip on the teeth and each time there is removal there is difficulty in detaching that can be painful and can cause damage to the enamel of the teeth.

These RTA systems can have limited control over precise tooth movements; hence the use of an RTA is complicated by use of additional attachment composites that are used as force transfer mediums for better localized tooth control. The attachments are often tooth coloured Food and Drug Authority (FDA) approved composite adhesive resins that are usually cured using light activated polymerization.

However, while claiming to be 'invisible_, the aligners still use visible attachment composites as a method of force delivery. These attachments visibly bulge out and if they are knocked off will also result in loss of enamel from the tooth, requiring the patient to make premature visits to the orthodontist. Also these attachments require complementary concavities in the aligner which result with the aligner more tightly hanging onto the teeth and making regular removal difficult, painful and likely to cause damage.

Several problems also arise with use of the conventional adhesive, including:
i. Hygiene;
ii. Discoloration; and
iii. Detachment of, particularly posterior portion of, the braces occurs in relation to rear/molar teeth And
iv. damage to tooth enamel when removing.

A major commercial disadvantage of RTA s ironically is the visibility of the attachment composites while the RTA s are advertised to be a 'clear' system, leading to patient dissatisfaction. In clinical reports, "blobs" of attachment composites are described as "crude" and in need of refinement and improvement. It is also suggested that these attachments are prone to discolouration and can remove enamel from the tooth's surface. Further, it is observed that chemical and physical changes occur to the RTA s over two weeks of wear to an extent that retrieved aligners at the end of two weeks are noticeably more opaque than at commencement of use.

The placement of attachments, their polishing, removal and reinsertion during refinement procedures and ultimately removal at the completion of treatment is also time consuming. As most cases require the placement of multiple attachments, it is costly to a clinician in terms of material as well as time costs.

At the removal of the attachments (either for refinements or completion), the attachments are usually ground away layer by layer judiciously and a final polish done to high shine the enamel and remove any trimming scratch marks. However careful the clinician may be, there is an inevitable chance of enamel removal during this procedure.

The appearance of these attachments, especially on the anterior teeth may be aesthetically unacceptable to some patients. These clear aligner systems are designed to be aesthetic alternatives to conventional braces. In situations where the clinician is not able to place attachments on the patients teeth due to aesthetic demands by the patient, the clinical predictability of teeth movement decreases markedly. RTA systems that currently do not include attachments are usually deemed highly inaccurate and do not move teeth as well as the systems with attachments.

Attachments are also horizontal projections on the patients teeth. Patient often complain that they stick into the surrounding perioral soft tissues, causing pain, discomfort and ulceration at the initial part of the treatment. They usually get accustomed to them after about a week.

It can therefore be seen that the use of an RTA in the prior art systems have the problems of:
a) Tight fit to retain in location
b) Painful to remove
c) Difficult to remove due to tight fit that can cause tearing of the surface of the teeth
d) Use of adhesives that come in contact with teeth and is likely to damage teeth enamel on removal or accidental dislodgement.

The deficiencies and drawbacks suffered by the prior art systems needs to be solved or at least approached in one form or another to provide an improved teeth aligner system and in particular a substantially damage ¯free clear teeth aligner system.

While the prior art therefore goes some way to addressing issues associated with orthodontic aesthetics by RTA s, there remains a need for an alternative means for anchoring an aligner system, improving its mechanical and retentive properties, that overcomes one or more of the deficiencies of the prior art in a practical and effective way.

An alternative force transfer system is needed to attach and maintain RTA s in place over teeth to apply an orthodontic aligning force to teeth while addressing problems of the prior art systems.

It is therefore an object of the present invention to address one or more of the foregoing problems. It is a further object to provide a useful alternative means for mounting an orthodontic aligner to teeth.

The present invention seeks to provide an oral adhesive, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

In accordance with the invention there is provided a method of providing orthodontic tooth movement (OTM) using a removable aligner, the method including the steps of providing a shaped removable aligner formed of a thermoplastic and moulded to an OTM fitting shape relative to the teeth of a patient; applying a layer of a gel to an inner surface of a teeth-receiving cavity of the thermoplastic aligner; and locating the shaped removable aligner with the applied gel layer in a required OTM fitting position on the teeth of the patient to provide an effective OTM force on the teeth.

In this way, the gel layer substantially separates and spaces the aligner from the teeth while providing a force transfer mechanism from the aligner to the teeth.

The gel can be a heat curable material providing a comparative stronger adhesion to the thermoplastic aligner than to the teeth of the patient. The comparative stronger adhesion to the thermoplastic aligner than to the teeth of the patient allows ready removal of the aligner.

The gel can be a heat curable material able to set in a shaped form to correspond with the aligner and/or teeth of the patient to provide a minimalist thickness gel layer. The gel layer are formed from an amount of gel substantially in the range of 0.7 to 1.5 grams.

The method can have prior to the applying the gel into a gel layer on the inner surface of a teeth-receiving cavity of the thermoplastic aligner, the step of undertaking a pretreatment of the surface with a pretreatment composition that alters the surface texture. The pretreatment can include scoring the inner surface of the teeth-receiving cavity of the thermoplastic aligner.

The gel can be a heat curable material which enables the setting of the gel is undertaken for a predetermined time on the aligner external of the patient and the remaining setting of the gel in location in the OTM fitting position in the patient to provide the shaped form to correspond with the aligner and/or teeth of the patient to provide a minimalist thickness gel layer.

Depending on whether it is anterior or posterior teeth, cusp tips or side contours, varying undercuts of dental anatomy, during the vacuum formation process, the plastic forms deferentially over the casts. the thickness of the plastic that forms the aligners (different brands) also affects the final potential space. The range of the gel layer filling the space can be between 100 to 800 micrometers The curing for the predetermined time on the aligner external of the patient during the setting period is preferably greater than 50% but less than 85%.

The shaping and spacing of the aligner from the teeth by the gel layer and the resilient nature of the gel layer allows for ready cyclic removal and insertion daily with effective replacement into OTM fitting position on the teeth of the patient.

The force transfer mechanism from the aligner to the teeth is cushioned by the gel layer to an extent while still allowing an effective OTM force on the teeth by the aligner which allows for ready cyclic removal and insertion daily with effective replacement into OTM fitting position on the teeth of the patient.

The gel is preferably a polysiloxane base material. The gel can be a heat curing polysiloxane base material.

The gel preferably is a heat curing two-part room temperature vulcanizable polysiloxane wherein the polysiloxane base material is heat curable by addition with use of a catalyst.

The curing can include a heat-generating method to speed up the heat affected gel curing rate. The heat-generating method to speed up the heat affected gel curing rate can use one or more of:
  a) Dissolution of calcium chloride. wherein the use of 1 to 3 grams of calcium chloride provides a significant amount of heat when a 1:1 mass ratio to water is used.
  b) uses a hot water bath.
  c) uses a heat plate.

In one preferred form, the heat-generating method is used to increase to a raised curing temperature to speed up the heat affected gel curing rate out of location of the patient until gel is cured to a predetermined percentage cure then removed from the heat-generating method and inserted in the aligner into patient to finalise curing at a temperature lower than the raised curing temperature. The raised curing temperature is preferably greater than 37t C. and the raised curing temperature could be about 55t C.

The predetermined percentage cure during the heat-generating method is preferably greater than 50% but less than 85%.

The predetermined percentage cure during the heat-generating method is about 80%.

The invention also provides a teeth aligner system providing orthodontic tooth movement (OTM) for use in assisting corrective realignment of a patients teeth, the aligner system including: a removable thermoplastic aligner having a teeth-receiving cavity with a teeth-aligning surface formed as an inner surface of the teeth-receiving cavity; a substantially transparent force transfer layer formed on the teeth aligning surface comprising a curable gel engaging between the teeth aligning surface and the patients teeth, enabling substantially a separation and spacing of the aligner from the teeth while providing a force transfer mechanism from the aligner to the teeth when in located in a required OTM fitting position on the teeth of the patient to provide an effective OTM force on the teeth. wherein the curable gel and the thermoplastic of the aligner are selected to provide a comparative difference of adhesion bond between the cured gel and thermoplastic aligner and the cured gel and the patients teeth allowing ready removal of the aligner without damage to the teeth and ready repositioning to the OTM fitting position.

The gel, upon completed curing of the gel, forms a first bond with the thermoplastic of the teeth aligning surface of the aligner and a second bond with the enamel surface of the teeth of the patient.

The transfer layer conforms to the teeth location configuration of the aligner and provides effective cushioning of initial orthodontic realignment force while substantially able to maintain a minimal force over time and multiple removal cycles effective for realignment of teeth.

A teeth aligner system according to any one of claims 1 to 14 wherein a heat curing two-part room temperature vulcanizable polysiloxane wherein the polysiloxane base material is heat curable by addition with use of a catalyst;

The system further including an applicator for providing a substantially constant thickness layer of gel over the teeth-aligning surface formed as the inner surface of the teeth-receiving cavity.

The teeth aligner system can further include a heat generating system for providing heat source to increase to the heat affected gel curing rate.

The heat generating system can be incorporated in the applicator.

The applicator can include a scoring means and a delivery means; wherein the scoring means affects a top surface of the aligner to forma textured surface in advance of the gel and wherein the delivery means stores and delivers a quantity of the gel to the inner surface of the teeth-receiving cavity.

The applicator preferably has a sponge tip on or adjacent the delivery end of the barrel, the sponge tip being movable relative to or over the delivery end during egress of the gel composition, wherein during delivery of the gel composition onto a surface of the aligner, the sponge tip applies microscopic score lines or textured surface to a surface of the dental straightening device, and wherein the scored or textured surface is adapted to allow preferential mechanical adherence of the gel layer to the dental straightening device. The sponge tip is selected from a range of polymeric materials including polyether, polyvinyl alcohol, or polyester, and a collection of bioglass particles.

The present invention in a further aspect is directed to a substantially damage ⁻free clear teeth aligner system for use in assisting realignment of a wearers teeth substantially without use of teeth attachments, the aligner system including:
  a. a removable thermoplastic aligner having a teeth-contacting surface with predetermined teeth location configuration for mounting on or over a patients teeth to urge orthodontic teeth realignment movement;
  b. a substantially transparent force transfer layer comprising a curable gel of predetermined thickness on the teeth contacting surface of the removable thermoplastic aligner, wherein the gel forms a first bond with the teeth contacting surface of the aligner and a second bond with the teeth of the wearer upon completed curing of the gel;
  c. wherein the transfer layer conforms to the teeth location configuration of the aligner and provides effective cushioning of initial orthodontic realignment force while substantially maintaining a minimal force over time and multiple removal cycles effective for realignment of teeth; and
  d. wherein the first and second bond formed between (i) the transfer layer and aligner and (ii) the transfer layer and teeth, respectively, allows retention of the aligner system on the wearers teeth and removal of the aligner substantially without damage to tooth enamel following removal of the aligner.
  e. an upper surface of the gel layer opposite the lower surface provides an attachment surface for frictional attachment to the teeth and allowing easy removal of the appliance from the wearers teeth without detaching the gel from the appliance while substantially minimising damage to tooth enamel during the removal process.

The aligner system of the invention allows effective adherence of the force transfer layer to the dental straightening aligner and to the teeth of a wearer such that the aligner can be mounted on the teeth and remain on the teeth to apply an orthodontic alignment force without attachment devices of the prior art, and be readily 'peelably_ removed from contact with the teeth of a wearer being preferentially retained in the aligner, while substantially minimizing removal of tooth enamel.

Further advantages of the present invention is no requirement for attachments, and there is substantially no disclororation of the aligner as this is protected by the force transfer layer hence aesthetics are improved.

Throughout this document and the claims defining the invention:

- ¿ The term 'aligner_ is to include orthodontic temporary wrap-around aligners or smaller arch aligners and including braces, plates or bridges formed of plastic, synthetic or other mouldable material to be inserted and place over teeth and connected to the teeth.
- ¿ The term 'oral adhesive_ is to include temporary adhesive for holding aligners over teeth and connected to the teeth in a reversible manner.
- ¿ The term 'adhesive teeth alignment system_ is to include temporary braces, aligners, plates or bridges formed of plastic, synthetic or other mouldable material to be inserted and place over teeth and connected to the teeth, and temporary adhesive for holding aligners over teeth and connected to the teeth in a reversible manner.

Preferably, the force transfer layer comprises a pourable, curable polysiloxane composition, wherein the polysiloxane composition is applied onto the teeth contacting surface of the removable thermoplastic aligner and allowed to cure so as to form a mechanical or chemical bond with the teeth engaging surface of the aligner, and wherein a surface of the polysiloxane composition, opposite the teeth engaging surface of the aligner, provides a temporary bond with the teeth, the difference between the first and second bonds allows preferential fitment and removing of the aligner system from the teeth substantially without removing tooth enamel.

In one embodiment, a surface texture is provided on the teeth contacting surface of the removable thermoplastic aligner to enhance the first bond between the aligner and force transfer layer.

Preferably the surface texture is formed on the teeth contacting surface of the aligner by an applicator. In one aspect, the surface texture is applied by the applicator before the polysiloxane composition is applied onto the teeth-engaging surface of the aligner. Preferably the applicator is adapted to microscopically etch the teeth engaging surface of the aligner to assist increasing the bond formed between the force transfer layer and the aligner and thereby improve preferential retention of the force transfer layer to the removable thermoplastic aligner. In addition, the second bond formed between the force transfer layer and teeth provides sufficient mechanical grippability_ to the teeth to effectively transfer an effective orthodontic force of the aligner to allow dental straightening and maintained on the teeth in a tooth straightening position, and the differential bond strength allows preferential removal of the aligner and force transfer layer from the teeth substantially without damaging removal of enamel from teeth surface. In essence, the force transfer layer is retained preferentially in the aligner when the aligner system is removed from the teeth for replacement or cleaning.

The surface texture of the aligner can be formed by a series of grooves wherein the grooves are effective for improving adherence of the force transfer layer to the teeth when the dental straightening aligner is worn by a patient.

Without being bound by theory, the force transfer layer composition of the invention provides a differential adhesion strength between a first interface formed between the textured surface of the dental straightening appliance and the gel layer, and a second interface between the gel layer and the patients teeth.

In a further related aspect of the present invention there is described a force transfer layer applicator for applying a layer of a curable gel composition of predetermined thickness to a teeth-engaging surface of a dental aligner including:

- a. a reservoir including one or more chambers for receiving a predetermined amount of a curable gel composition base and a catalyst,
- b. a mixing chamber at or close to a dispensing end of the reservoir;
- c. an applicator tip for dispensing a curable gel composition aft of the mixing chamber;
- d. a drive mechanism upstream of the reservoir for driving the curable gel composition base and a catalyst towards the mixing chamber;
- e. a sponge tip containing a scoring means allowing for the mechanical etching of the aligner upon application; and
- f. wherein in use, the drive mechanism promotes displacement of the gel and catalyst towards the mixing chamber for combining, and combined gel/catalyst is urged through the sponge tip for dispensing; and
- g. wherein the applicator is moved over the straightening/aligner appliance as the gel is liberated such that the scoring means contacts the surface of the dental straightening appliance in advance of gel front to form a textured surface for adherence of the gel.

The gel when applied sits in the microscopically etched grooves on the teeth engaging surface of the straightener/aligner appliance. The gel would push tightly into these grooves coupling it to the surface of the aligner appliance.

The aligner system of the invention represents an advance over the prior art as a result of preferential bonding of the cured gel composition to the textured surface of the dental straightening appliance compared with frictional bonding between the gel layer surface and a wearers teeth. To date there has been no ability to provide differential bonding other than by use of dental adhesive cement or attachment wiring, which adversely affect tooth enamel when an aligner device is removed and/or cause patient discomfort.

In one embodiment, the surface texture on the appliance is formed by an applicator which scores the surface in advance of delivery of the gel layer. Preferably the applicator is adapted to etch the teeth engaging surface of the appliance, wherein the surface texture is formed by a series of microscopic grooves effective for mechanical bonding between the gel layer and appliance.

The mechanical grippability of the liner allows the dental straightening appliance to be maintained in a tooth straightening position, and also allows peeling removal from the teeth substantially without damaging removal of enamel from teeth surface.

Preferably the sponge tip can be selected from a range of polymeric materials including polyether, polyvinyl alcohol, or polyester, and a collection of bioglass particles Without being bound by theory, the system of the invention provides a differential adhesion strength between a first interface formed between the dental straightening appliance and the gel layer, and a second interface between the liner and the patients teeth.

Preferably the force transfer layer can be a polysiloxane selected from compounds having the general formula below:

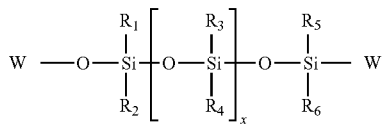

wherein R1, R2 and R5 and R6 can be an alkyl or an alkyl group or a phenyl group;
wherein R3 and R4 can be selected from alkyl groups and vinyl groups; and
wherein R7 and R8 can be selected from alkyl groups and vinyl groups The polysiloxane composition can include one form which is provided under the trademark Silpuran™ of Wacker Chemie AG.

Preferably the gel layer comprises a polysiloxane gel composition of two-part catalyst wherein the polysiloxane gel composition and catalyst are present in a ratio of 50:50 to 20:80, wherein the gel composition and catalyst are combined to form a film of predetermined thickness on a surface of the dental straightening appliance, and wherein one surface of the appliance is scored to form a surface texture effective for adhesion of the gel layer to the scored surface of the straightening appliance.

The polysiloxane gel composition can include a source of calcium such as hydroxyl apatite. Calcium can be therefore applied directly to the teeth by diffusion through the S1 matrix, to maintain teeth and sufficient lubrication while wearing the dental appliance.

The polysiloxane gel composition can include additional agents selected from an antibacterial agent, probacterial agent, calcium salts and bioactive glass.

The present invention is directed to a multi-functional liner for adhering to a dental brace appliance, the liner comprising at least one component formed of a curable polysiloxane composition applied to a modified teeth-engaging surface of the appliance to form an effective differential adhesion bond strength between a first interface formed between the aligner and the gel layer and a second interface between the gel layer and the patients teeth.

The effective differential adhesion bond strength can be such that the first interface formed between the aligner and the liner/gel is greater than second interface between the oral adhesive and the patients teeth wherein the aligner is more readily removed with the gel layer from the patients teeth.

The effective differential adhesion bond strength can have the ratio of bond strength formed at the first interface formed between the aligner and the liner/gel and the second interface between the liner/gel and the patients teeth of between about 3:1 to 10:1.

The effective differential adhesion bond strength can have the bond strength at the second interface between the gel layer and the patients teeth allowing the aligner to be fitted to and effective for realignment of teeth, and removed from teeth substantially without damaging teeth enamel.

It can be seen that the teeth aligner system of the present invention is found to be effective in allowing fitting of a clear orthodontic aligner onto teeth for the purpose of realigning a patients teeth, and upon removal of the aligner teeth enamel is substantially free from adhesive residue. Further, it is found that the gel layer of the present invention retains the aligner system in a desired position without adverse structural effects of the aligner, and the gel layer is substantially transparent hence aesthetics of a clear orthodontic aligner is improved over mounting systems of the prior art.

The curable polysiloxane composition can be selected from compounds having the general formula below:

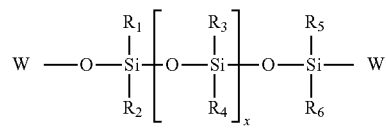

wherein R1, R2 and R5 and R6 can be an alkyl group or a phenyl group;
wherein R3 and R4 can be selected from alkyl groups and vinyl groups; and
wherein R7 and R8 can be selected from alkyl groups and vinyl groups The curable polysiloxane composition can be of one form such as known under the trade mark Silpuran 2430.

The gel layer can be provided in a form which can be cured from a one pack form.

The gel can include a catalyst.

The catalyst can primarily include Platinum (Pt). The catalyst might comprise organometallic complexes.

The ratio of the curable polysiloxane composition to the catalyst can be in the range of 60/40 to 70/30 in order to provide a compression malleability providing a deformable viscoelastic.

The gel can be activated by an activator for initiating RTV (room temperature vulcanization) addition curing.

The activator can be selected from a heat source, a UV source, or an IR source.

It can be seen that the crosslinking is effective for producing an adhesive having preferential bond strength whereby minimal residual adhesive remains on a patient s teeth after removal of the aligner.

The polysiloxane component can include an inorganic filler, wherein polysiloxane can be present in an amount of up to about 95 percent by weight.

The polysiloxane component can further include a minor amount of a diluent such as methacrylate esters, dimethacrylate esters, trimethacrylate esters, wherein the polysiloxane can be present in an amount of up to about 95 percent by weight.

Throughout the body of the specification, the term :adhesion refers to preferential bonding of the gel to one surface such as teeth over another surface such as orthodontic aligner.

The gel preferably includes a calcium fortifier to assist in the protection at the second interface of gel to teeth to protect enamel surface.

The gel preferably includes an antibacterial agent to assist in the general protection at the first interface between the gel and the aligner and the second interface of gel to teeth to decrease growth of bacteria due to the increased amount of rough enclosed surface areas and decrease of saliva washing which otherwise enhances bacteria growth.

The gel preferably includes a probiotic agent to assist in the protection at the second interface of gel to teeth to encourage growth of essential bacteria which are important for the overall health of the mouth, and to replenish any essential bacteria which may have been perturbed by the antibacterial agent and/or any other component of the gel.

The present invention in a further related aspect is directed to a substantially damage ⁻free dental brace gel for releasable coupling of a substantially transparent dental straightening appliance to a patient s teeth, the dental brace gel comprising a pourable, curable polysiloxane composition, wherein the polysiloxane composition is poured onto a teeth engaging surface of the dental straightening appliance and allowed to cure so as to form a chemical bond with the teeth engaging surface, and wherein the teeth engaging surface of the appliance has applied thereon a surface texture which allows mechanical bonding engagement of the textured surface with the gel, wherein in use the gel layer is effective to maintain the dental straightening appliance in a desired position, and wherein the mechanical engagement allows preferential removing of the appliance from the teeth substantially without removing tooth enamel.

In a related aspect of the present invention, there is a teeth alignment system including: a removable thermoplastic aligner for orthodontic treatment of teeth alignment; a force transfer layer on the removable thermoplastic aligner adapted to form a first bond between the aligner and force transfer layer, and a second bond between the force transfer layer and the teeth of a wearer, wherein the first bond strength is greater than the second bond strength effective for retaining the aligner on teeth, transferring orthodontic force, and providing preferential removal of the force transfer layer from the teeth; the force transfer layer having a composition including:

a two-part room temperature vulcanizable polysiloxane wherein the polysiloxane is selected from compounds having the general formula 1 below

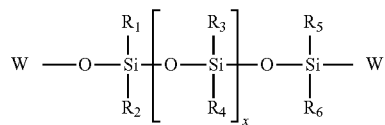

where $R_1$, $R_2$ and $R_5$ and $R_6$ can be an alky group or a phenyl group
where R3 and R4 can be selected from alkyl groups and vinyl groups, and where R7 and R8 can be selected from alkyl groups and vinyl groups
and a catalyst comprising a metal such as Pt or organometallic complexes; and an activator for initiating RTV addition curing;
wherein the gel composition is applied as a gel film to an internal surface(s) of the aligner, and wherein the adhesion composition when cured has adhesion determined by preferential bond strength analysis such that preferential bonding occurs at the gel aligner interface and a probiotic agent for maintaining the healthy bacteria around the teeth.

The aligner can be a substantially transparent plastic teeth alignment aligner.

The inorganic filler can be present in an amount of about 60 to about 75 weight percent of the gel.

Preferably the finely divided inorganic filler is selected from the group consisting of silanized quartz, silica, fumed silica, zirconium, barium or strontium glass and silanized glass.

Therefore, in one form the invention provides a teeth aligner system for use in assisting straightening a wearers teeth substantially without use of attachments, the dental brace comprising: a removable thermoplastic aligner appliance having a predetermined teeth location configuration for mounting on or over a patients teeth to urge teeth movement, the aligner including a teeth-contacting surface having at least a portion being textured; a force transfer layer on the textured portion of the teeth contacting surface of the aligner, wherein an inner surface of the force transfer layer and the textured surface portion of the aligner form a bond upon cross linking of the gel; wherein the aligner is effective for allowing receipt of and positioning of the teeth in the appliance to obtain a desired straightening effect; and wherein an outer surface of the gel layer opposite the inner surface provides an attachment surface to the teeth allowing easy removal of the appliance from the wearers teeth without detaching the gel from the appliance while substantially minimising damage to tooth enamel during the removal process.

The combination of the aligner and the force transfer layer can be substantially clear and allow substantially damage ⁻free removal after use. The force transfer layer can be a polysiloxane gel curable composition.

Preferably the inner surface of the force transfer layer and the textured surface portion of the appliance forms a mechanical bond upon cross linking of the force transfer by curing of the gel.

The curved shaping and configuration of the dental straightening/aligner appliance can aid frictional attachment to the teeth.

Preferably the gel layer composition of the invention provides a differential adhesion strength between a first interface formed between the textured surface of the dental straightening appliance and the gel layer, and a second interface between the gel layer and the patients teeth.

The removable thermoplastic aligners are preferably selected from polypropylene, co-polyester of polyethylene terephthalate, hybrid copolyester.

The gel forming the force transfer layer is preferably partially cured by exposure to heat at about 55 degrees C. before dispensing onto the aligner, and the partially cured layer and aligner fitted to a wearers teeth where curing is completed at a lower temperature.

The predetermined thickness of the force transfer layer can be controlled by a combination of applicators.

The orthodontic force exerted by the aligner system of the invention is able to be maintained at a minimal level over a cycle period of 70 in a two week period.

The removal force of the aligner system of the invention is preferably.

Preferably the effective differential adhesion bond strength of the first interface formed between the aligner and the oral adhesive so as to be greater than second interface between the oral adhesive and the patients teeth wherein the aligner is more readily removed with the oral adhesive from the patients teeth.

The effective differential adhesion bond strength is such that the first interface formed between the aligner and the liner/gel is greater than second interface between the oral adhesive and the patients teeth wherein the aligner is more readily removed with the gel layer from the patients teeth.

In a particular form, the effective differential adhesion bond strength can have the ratio of bond strength formed at the first interface formed between the aligner and the liner/gel and the second interface between the liner/gel and the patients teeth of between about 3:1 to 10:1.

Preferably the effective differential adhesion bond strength is provided by scoring the textured portion of the teeth contacting surface of the dental straightening/aligner appliance to increase the adhesive bond of first interface of the gel layer to the dental straightening/aligner appliance and enable the lesser bond strength at the second interface between the gel layer and the patients teeth allowing the aligner to be fitted to and effective for realignment of teeth, and removed from teeth substantially without damaging teeth enamel.

In a related aspect of the present invention, there is a teeth alignment system including: a removable thermoplastic aligner for orthodontic treatment of teeth alignment; a force transfer layer on the removable thermoplastic aligner adapted to form a first bond between the aligner and force transfer layer, and a second bond between the force transfer layer and the teeth of a wearer, wherein the first bond strength is greater than the second bond strength effective for retaining the aligner on teeth, transferring orthodontic force, and providing preferential removal of the force transfer layer from the teeth;

the force transfer layer having a composition including: a two-part room temperature vulcanizable polysiloxane wherein the polysiloxane is selected from compounds having the general formula 1 below

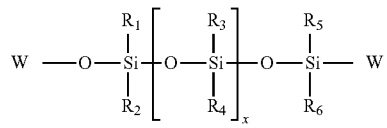

where $R_1$, $R_2$ and $R_5$ and $R_6$ can be an alky group or a phenyl group where R3 and R4 can be selected from alkyl groups and vinyl groups, and where R7 and R8 can be selected from alkyl groups and vinyl groups and a catalyst comprising a metal such as Pt or organo-metallic complexes; and an activator for initiating RTV addition curing;

wherein the gel composition is applied as a gel film to an internal surface(s) of the aligner, and wherein the adhesion composition when cured has adhesion determined by preferential bond strength analysis such that preferential bonding occurs at the gel aligner interface and a probiotic agent for maintaining the healthy bacteria around the teeth.

The invention also in one form provides a method of applying an aligner in a required temporary set position within the oral cavity of a patient the method including the steps of:

a. providing an aligner for use with a patient, wherein the aligner has a modified textured teeth-engaging surface;

b. applying an oral gel layer to a surface of polymeric material of the aligner comprising an interior surface to receive at least a portion of one or more teeth of the patient when the aligner is worn;

c. curing the curable adhesive, the curing comprising after the applying to the curable adhesive of a light source sufficient to cause the curable adhesive to cure to form a cured product bonded to the surface of the polymer material;

d. the curable adhesive comprising:

e. a polysiloxane selected from compounds having the general formula 1 below

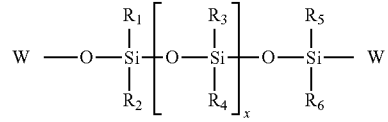

where $R_1$, $R_2$ and $R_5$ and $R_6$ can be an alky group or a phenyl group where R3 and R4 can be selected from alkyl groups and vinyl groups, and where R7 and R8 can be selected from alkyl groups and vinyl groups and f. an initiator.

According to a further aspect of the present invention, the aligner gel is preferably Silpuran 2430.

The aligner gel can include constituent components of calcium fortifier.

The aligner gel can further include constituent components of an antibacterial agent.

It can be seen that the invention of an aligner with gel layer provides the benefit of the gel being a mechanical-coupling interface between clear aligner systems and the teeth upon which they sit. The gel does not harbour unwanted bacteria is essential if the product is to be used safely in a patient s mouth. The gel does not promote anomalous growth of select organisms in the patients mouth.

The gel layer is biocompatible to the oral tissues. It is preferably a two-paste system that is mixed when extruded in a 'gun-mixing tip' system. From the softer gel state, it then sets over about a minute in a combined chemical reaction accelerated with intra oral temperatures, into a semi solid state.

The gel is thin enough to perpetuate the potential space and undercuts of the teeth between the teeth and the aligners. It is firm in order to withstand intra oral pressures and forces. The gel demonstrates minimal creep to allow an extended intra oral usage without constant replacement. It should not dampen the pressures and stresses that the original aligners have on the teeth prior the placement of the gel but may shrink slightly in dimension to enhance that force level. It should not be too porous or permeable to allow the blatant absorption of saliva and other liquids in the oral cavity. It should not 'lock in' the aligners and disallow simple removal of the aligners.

The gel layer of the invention is easily applied onto a clean and dry aligner appliance using the custom-made dispenser tip. After the insertion of the aligners, any excess gel can be easily cleaned out from the gums and surrounding soft tissues using a cotton bud or tissues before the initial set of the gel. The biogel adheres preferentially to the aligner and not the teeth when the aligners are removed. It is easily peeled off (from the aligners) and discarded at the end of its use, and can be biodegradable.

As the aligners are worn all the time except eating and brushing, the biogel should withstand an extended period of use. Ideally it is changed with every new aligner (2-4 weeks), but depending on dimensional changes and its ability to maintain consistent force levels over the test period, the biogel may need to be changed 2-3 times daily.

The gel layer of the invention allows a seamless connection between the aligners and the teeth, transferring the forces originally designed and intended by the manufacturers of the aligner systems.

It negates the need for attachment placement completely. This improves the aesthetics of clear aligner systems, improves the patient experience with any clear aligner systems, decreases the chair time and costs of the clinician and prevents the damage to the enamel when the attachments are removed.

The gel is tested for hypersensitivity and allergic reactions. With prolonged aligner wear, the buffering effect of saliva neutralising the oral acids is reduced. This increases carious incidences and leads to higher chances of enamel decalcification. The biogel may be incorporated with a Fluoride releasing and/or tooth mousse C PAP calcium phosphorous remineralisation agent to negate that effect.

The aligner gel can be applied using a syringe-type device that can accommodate a two-part gel component system that on mixing undergoes a cross linking-type reaction to yield a solid translucent film. This film functions to fill any gaps between aligner and teeth. Patient will typically wear aligner throughout the day and only require removing them for eating. The Aligner Gel is robust enough to withstand regular detachment/reattachment of the aligner/Aligner Gel composite device as required by the patient to follow their daily eating schedule.

Patients performs the Aligner Gel protocol each time a new aligner is fitted (currently~every two weeks in accordance with the stepwise correction schedule dictated by the orthodontist/aligner manufacturer)

The aligners are preferably formed of a plastic material so as to enhance the effective differential adhesion bond strength of the first interface formed between the aligner and the oral adhesive so as to be greater than second interface between the oral adhesive and the patients teeth wherein the aligner is more readily removed with the oral adhesive from the patients teeth.

The 'biogel' system attempts to negate the need for the placement of attachments in any clear aligner systems (either digital or manually made ones). It should be a biocompatible material that is sufficiently thin that sits between the teeth and the plastic aligners. This interphase material allows the clear aligner system to function superiorly without the need for the placement of attachments on the patients teeth.

It can be seen that the system of the invention negates the need for attachment placement completely. This improves the aesthetics of clear aligner systems, improves the patient experience with any clear aligner systems, decreases the chair-time and costs of the clinician and prevents the damage to the enamel when the attachments are removed.

BRIEF DESCRIPTION OF THE ACCOMPANYING DRAWINGS

FIG. 1: provides a plan schematic representation of dental surfaces of teeth in the mandible;

FIG. 2: provides schematic plan view of a teeth aligner system for use in the present invention;

FIG. 3: provides a schematic vertical cross-section of the tooth across B-B of the aligner system of FIG. 2 in use in an embodiment of the invention;

FIG. 4: is a graphical representation of force versus time characteristics of a continuous interrupted orthodontic tooth movement (OTM);

FIG. 5: is a diagrammatic flow diagram of a method of preparing an aligner system in accordance with an embodiment of the invention;

FIG. 6A: is a diagrammatic front view representation of an applicator system for storing, mixing and delivering a curable gel composition to an aligner for forming a gel layer on the aligner in accordance with an embodiment of the invention;

FIG. 6B: is a diagrammatic rear view representation of an applicator system for storing, mixing and delivering a curable gel composition to an aligner for forming a gel layer on the aligner in accordance with an embodiment of the invention;

FIG. 7A: is a diagrammatic of a gel applicator in chisel shape for applying a layer of curable gel to aligner useable with the applicator system of FIG. 6 in accordance with an embodiment of the invention;

FIG. 7B: is a diagrammatic view of a gel applicator in pencil shape for applying a layer of curable gel to aligner useable with the applicator system of FIG. 6 in accordance with an embodiment of the invention;

FIG. 8: is a graphical representation of temperature increase versus time for different $CaCl_2$; water; CMC masses in which different mass ratios of calcium chloride obtained different temperature increases, of 27é C, 36é C and 40é C for 1 g:1 g, 2 g:2 g and 3 g:3 g of calcium chloride:water, respectively so that room temperature water at 25é C, the 1:1, 2:2 and 3:3 mass ratios are able to obtain 52é C, 61é C and 65é C of heat, respectively with the peak temperature occurred at the 1 minute mark, then slowly decreasing over time;

FIG. 9: is a diagrammatic side view of a $CaCl_2$ and water applicator in accordance with an embodiment of the invention for applying the curable gel composition to an aligner for forming a gel layer on the aligner in accordance with an embodiment of the invention;

FIG. 10: is a diagrammatic flow diagram showing steps for speeding curing of force transfer gel composition with a heat generating system in accordance with an embodiment of the invention;

FIG. 11A: is a front view of an alternative applicator design with front view showing chambers for maintaining first and second components of gel separate until in use and applicator slot, in accordance with an embodiment of the invention;

FIG. 11B: is a back view of the alternative applicator design of FIG. 11A with back view showing chambers for maintaining $CaCl_2$ and water separate until combined to allow dissolution as a heat generating means system for speeding curing of force transfer gel composition in accordance with an embodiment of the invention;

FIG. 12: is a flow diagram of steps for combining and setting components of the gel and with selective extent of curing of force transfer gel composition in steps external to oral cavity and in-situ formation accordance with an embodiment of the invention;

Figure 17:
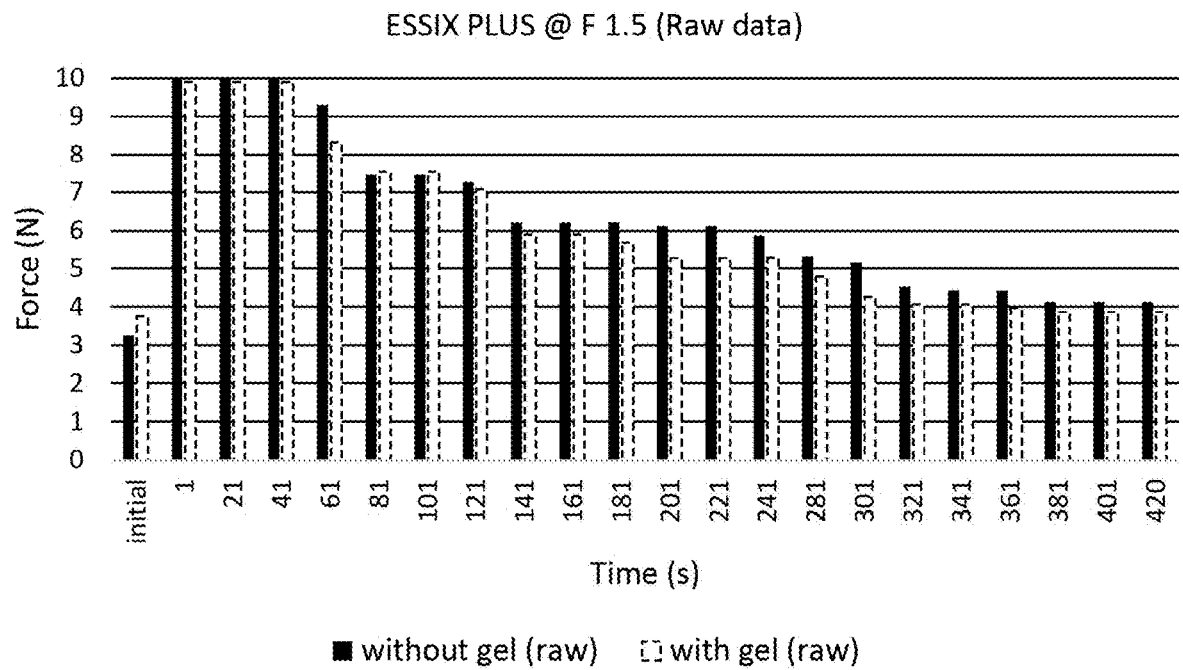
FIG. 17 shows graphical results of force transfer exerted by aligner system of the invention with time on front teeth surfaces using a first aligner of ESSIX PLUS type with 0.97 grams of gel forming gel layer versus control aligner without gel layer.
Figure 18:
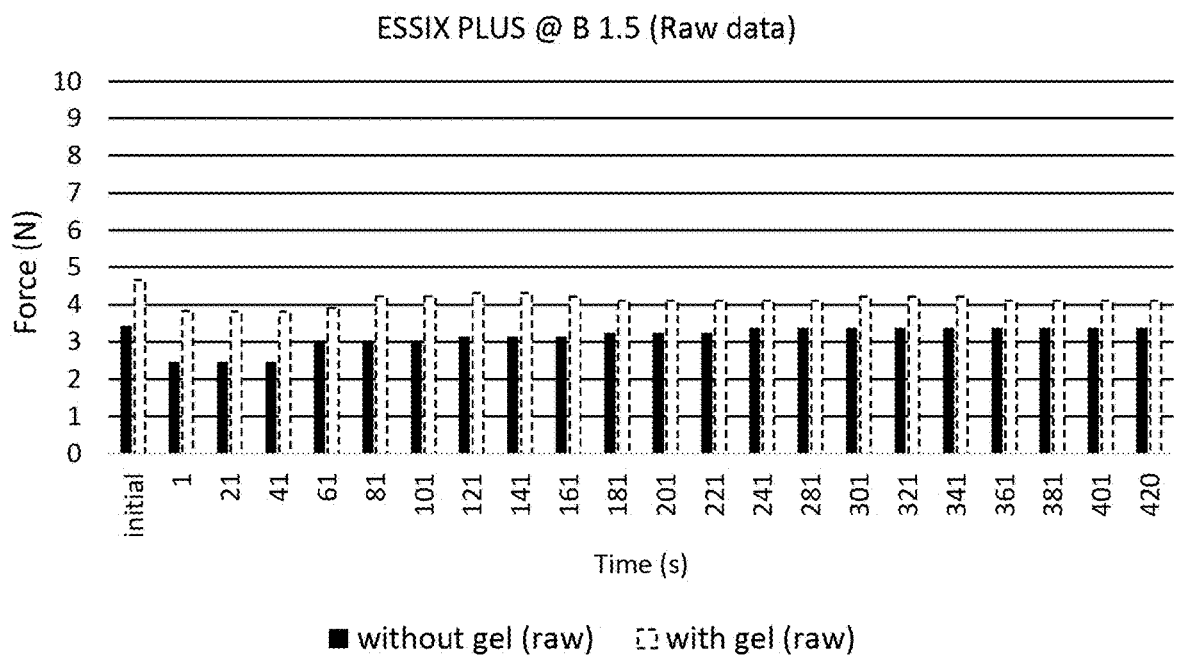
FIG. 18 shows graphical results of force transfer exerted by aligner system of the invention with time on front teeth surfaces and rear teeth surfaces using a first aligner of ESSIX PLUS type with 0.97 grams of gel forming gel layer versus control aligner without gel layer.
Figure 19:
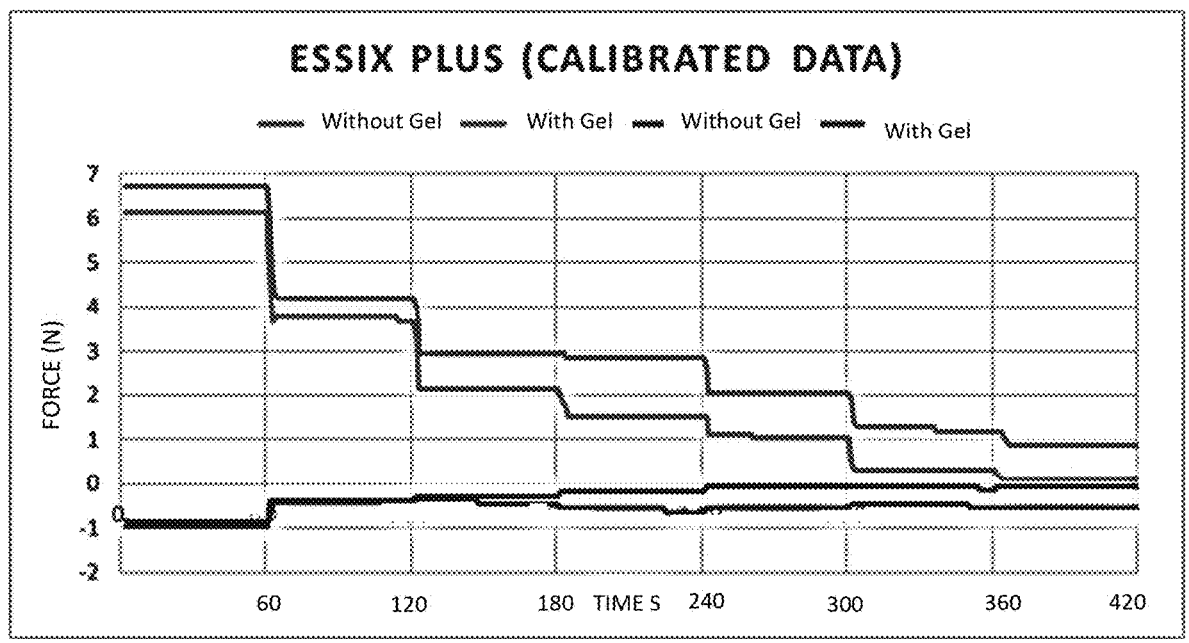
Figure 20:
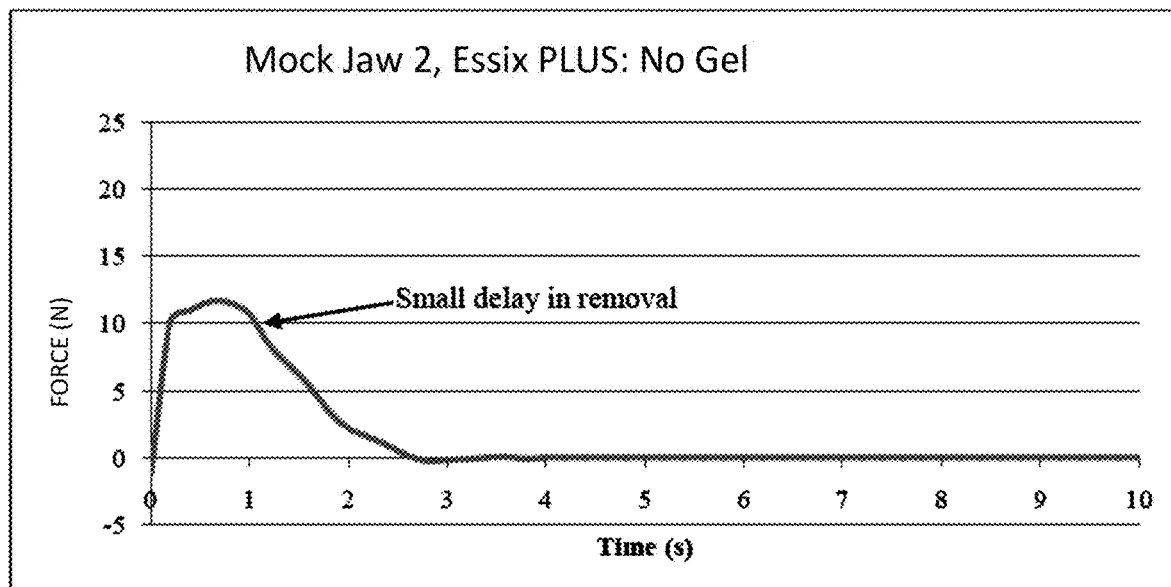
Figure 21:
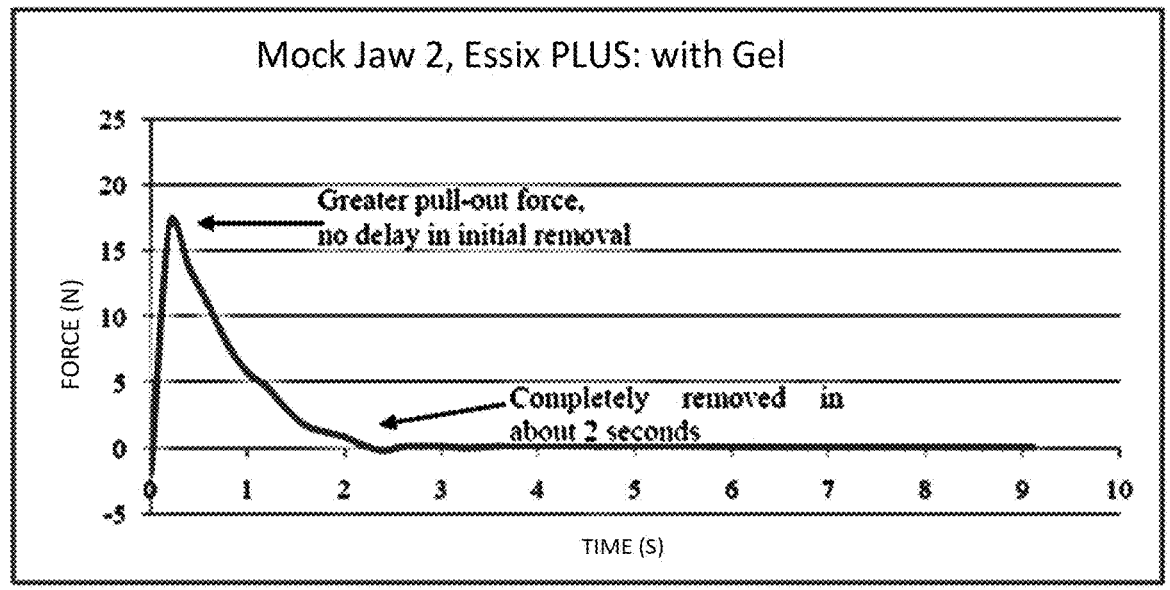
Figure 22:
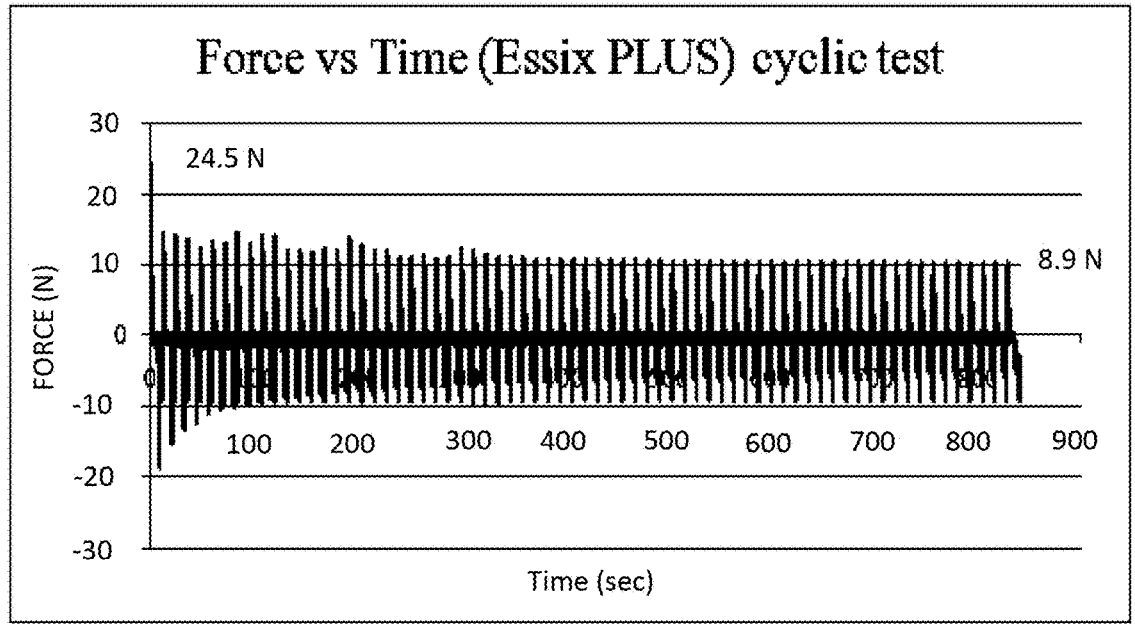
Figure 23:
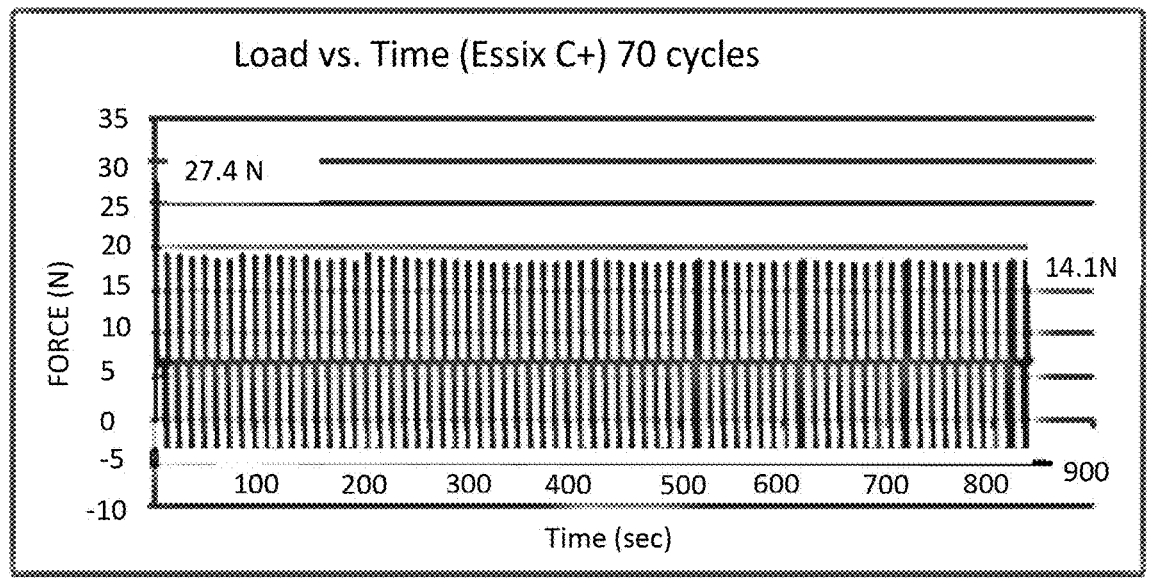
Figure 24:
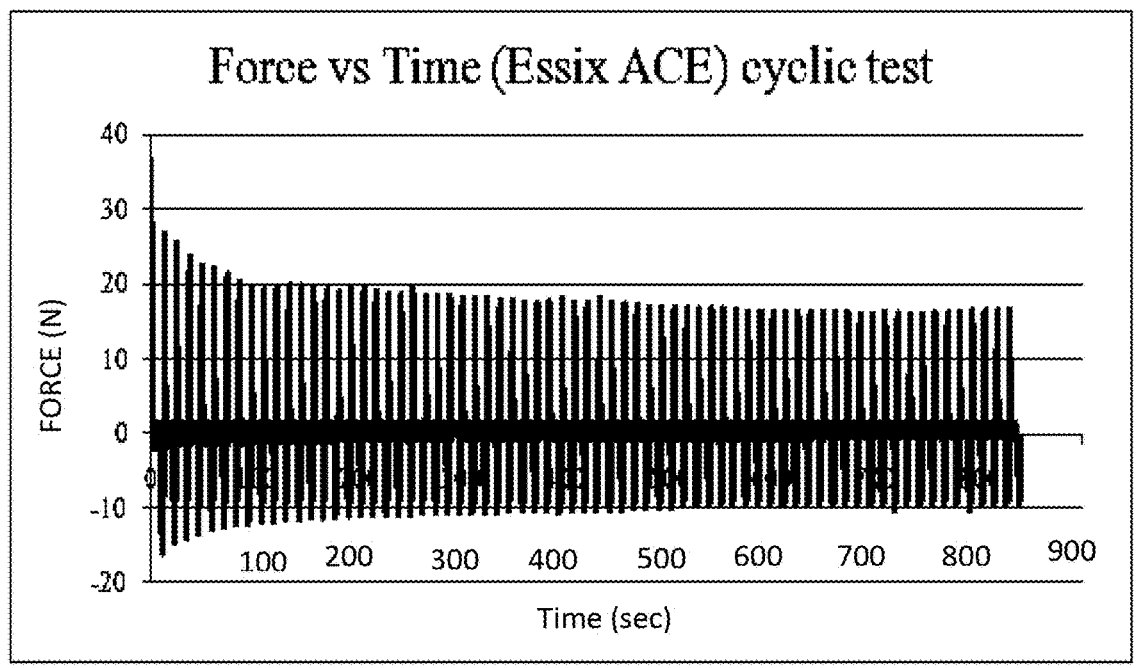
Figure 25:
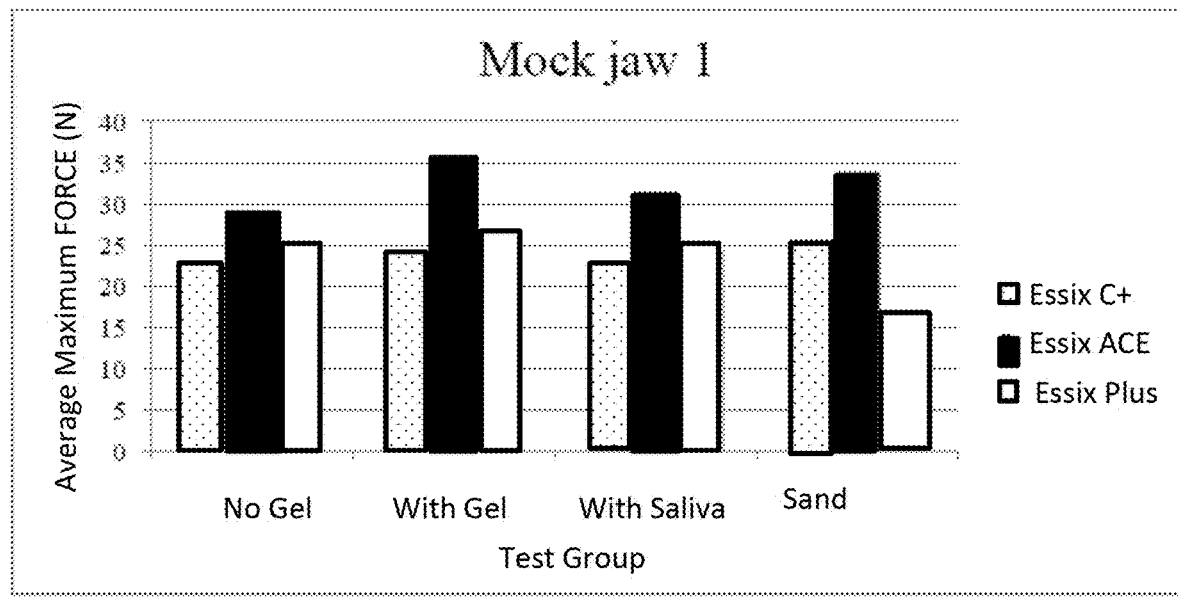
Figure 26:
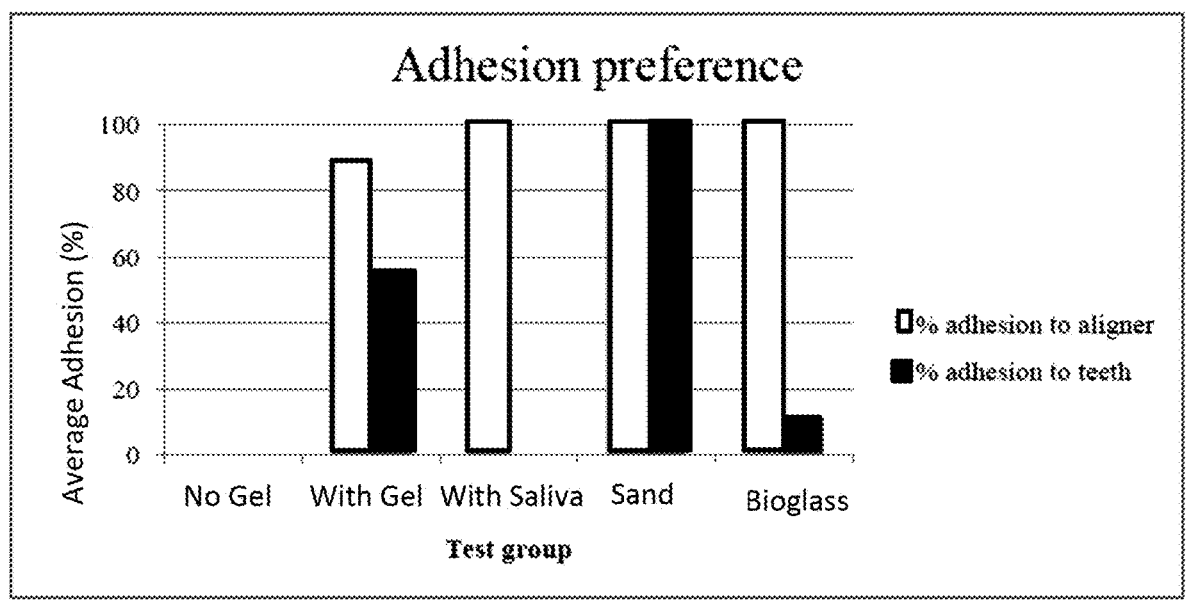

FIG. 19: are graphical results of calibrated data of FIGS. 17 and 18 with force exerted by aligner system of ESSIX PLUS type for use in an embodiment of the invention with time on front and back teeth surfaces using a first aligner versus control aligner;

FIG. 20: are graphical experimental results showing pull out force with reference to time from a mock jaw using a conventional aligner (no force transfer layer) and no gel;

FIG. 21: are graphical experimental results showing pull out force with reference to time from a mock jaw using aligner system with the gel layer in accordance with an embodiment of the invention;

FIG. 22 shows graphical experimental results showing force over 70 cycles of in use and removal and refitting into OTM position in the patient of the ESSIX PLUS type of aligners with gel layer showing the maintaining of effective force transfer to maintain cyclic OTM force in use;

FIG. 23 shows graphical experimental results showing force over 70 cycles of in use and removal and refitting into OTM position in the patient of the ESSIX C+ type of aligners with gel layer showing the maintaining of effective force transfer to maintain cyclic OTM force in use;

FIG. 24 shows graphical experimental results showing force over 70 cycles of in use and removal and refitting into OTM position in the patient of the ESSIX ACE type of aligners with gel layer showing the maintaining of effective force transfer to maintain cyclic OTM force in use;

FIG. 25: is a graphical representation of comparative pull out force with time from a mock jaw using three types of aligners in an aligner system without gel, with gel layer in accordance with an embodiment of the invention, with only saliva and with conventional aligner;

FIG. 26: is a graphical representation of comparative preferential adhesion to test surfaces of aligner as against adhesion to the teeth for variety of test groups including no gel where there is no adhesion at all, with gel in accordance with an embodiment of the invention showing effective preferential difference; with saliva showing the total lack of effective contact with the teeth, and inclusion of bioglass scratching of the aligner and use with gel in accordance with an enhanced embodiment of the invention showing the substantial improvement of comparative adhesion.

DESCRIPTION OF PREFERRED EMBODIMENTS

It is noted in the following description that like or the same reference numerals in different embodiments denote the same or similar features. The following examples further illustrate the various embodiments of the present invention. Neither these examples nor any of the foregoing disclosure is construed as limiting in any way the scope of the present invention. Unless otherwise indicated, all parts and percentages are by weight.

Figure 1:
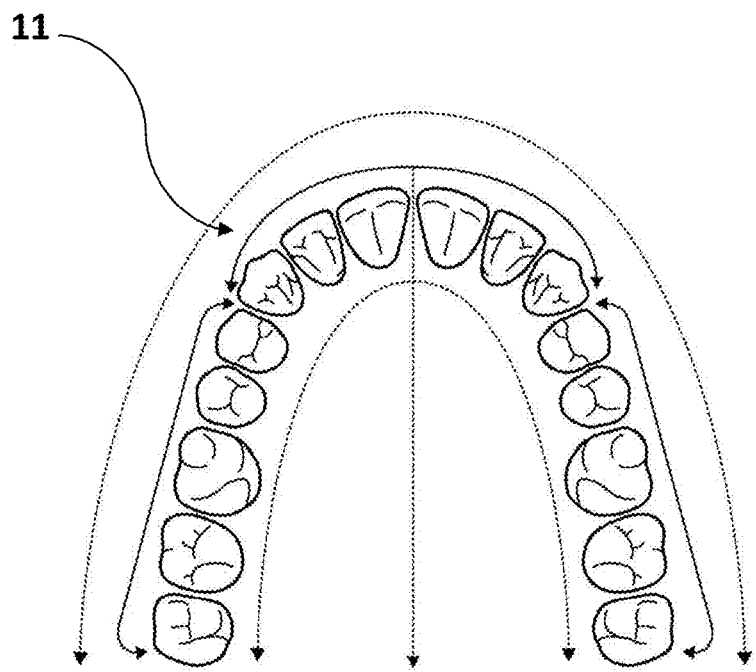
Figure 2:
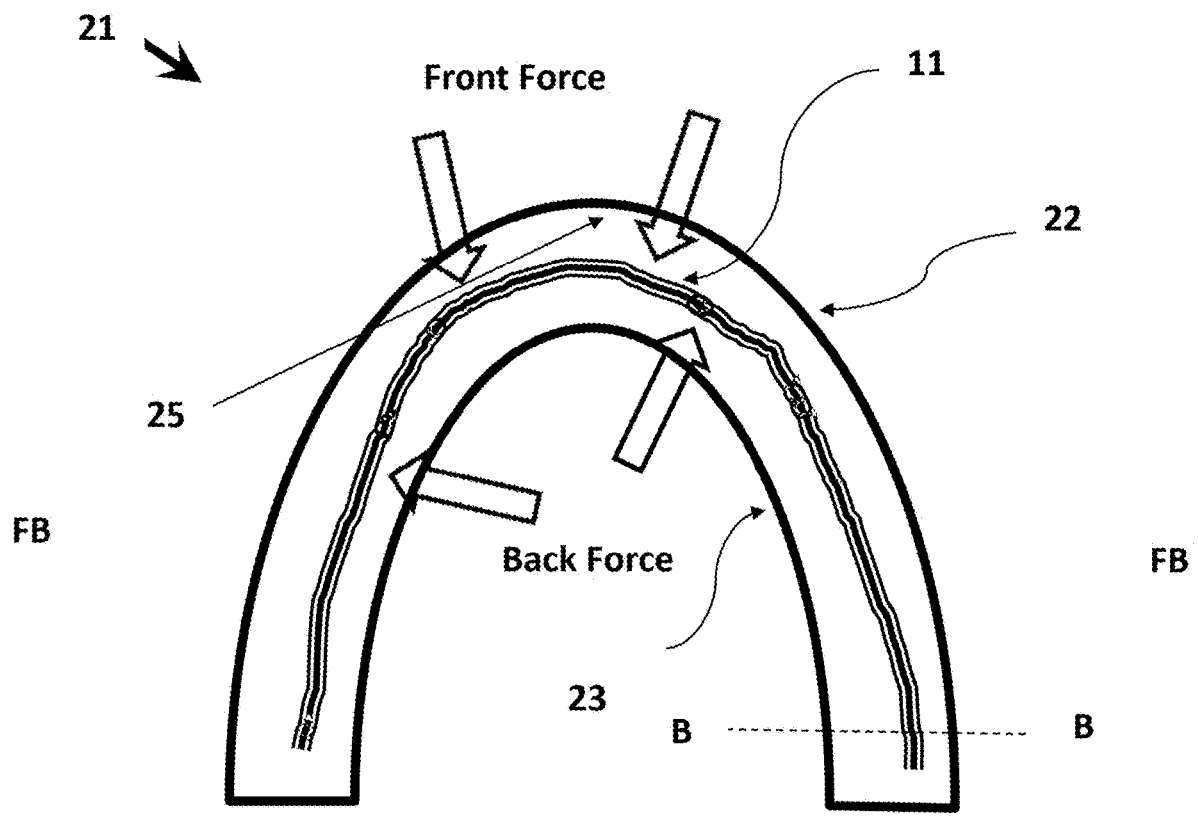
Figure 3:
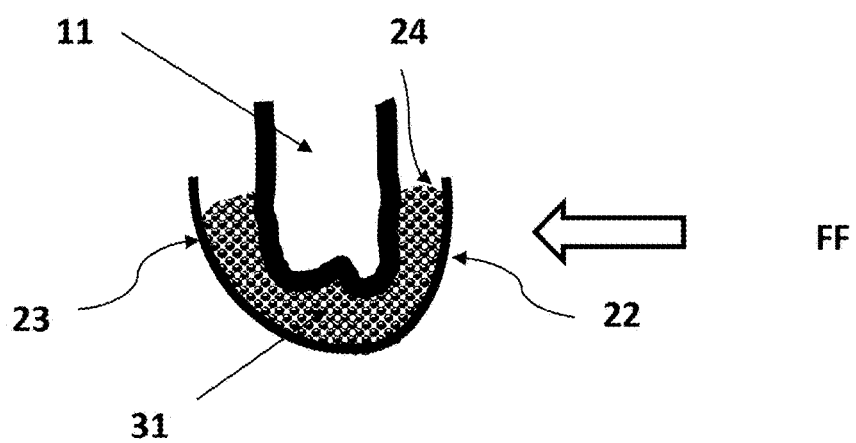
Figure 4:
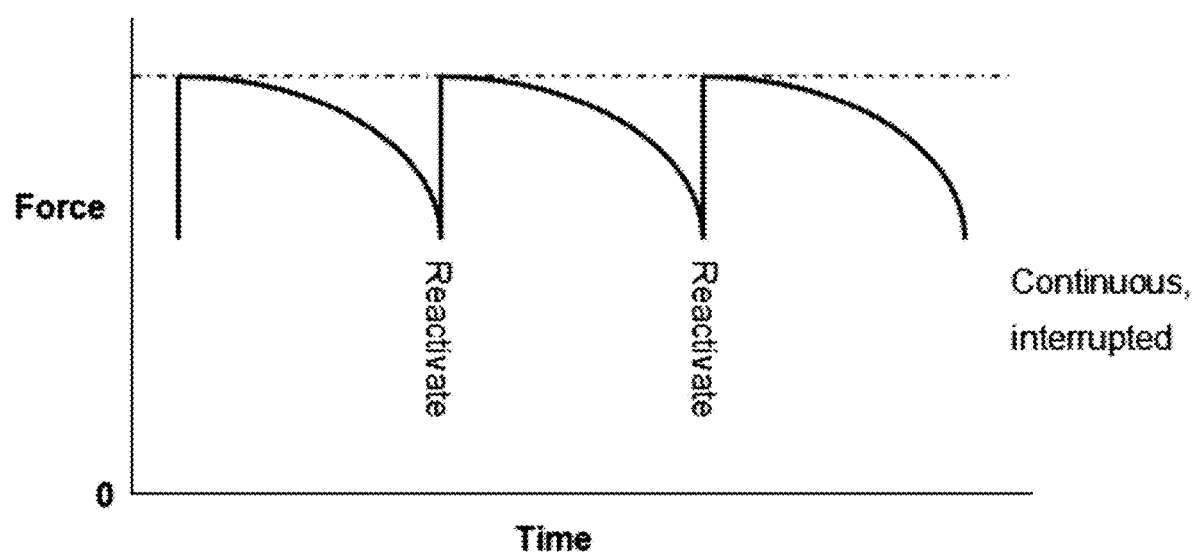

Referring to FIGS. 1, 2 and 3, there is shown an aligner system 21 comprising a substantially transparent removable thermoplastic aligner 22 which is configured to assist alignment of teeth 11 of a patient when in use in undergoing OTM treatment. The removable aligner 22 has a teeth-engaging recess 24 between a front part 22 and a rear part 23 for receiving the teeth 11 of the patient.

The aligner is structured to give a greater front force on the front of the teeth 11 relative to the back force on the rear of the teeth in order to provide an OTM effective force on the teeth 11.

However, the system includes a force transfer means in the form of a gel layer 31 that is comparatively more preferentially attached to the inner surface 23 of the aligner than to the teeth 11. This comparative adhesion is enhanced by the inner surface 23 being a textured surface formed by various methods. One group of methods occurs after construction of the aligner such as use by scouring and particularly using bioglass to scour. Another group of methods is during construction of the aligner such as use by forming peaks and troughs in the mould of the inner surface or horizontal moulded lines etc.

A suitable inner surface 25 is the textured surface forms on which a force transfer gel layer 31 is securely attached. In use, the recess 24 of the dental aligner 22 receives teeth 11 such that the force transfer layer 31 and the aligner 22 is retained cyclically by frictional fit while preferentially being retained adhesively on the aligner 22. The bond between the gel layer 31 and dental aligner is greater than the attachment of the gel with the teeth forming a differential so that the gel layer allows the brace to be removed by peeling away from the teeth without removal of the gel from the aligner, and without removing or minimal effect on tooth enamel.

Figure 5:
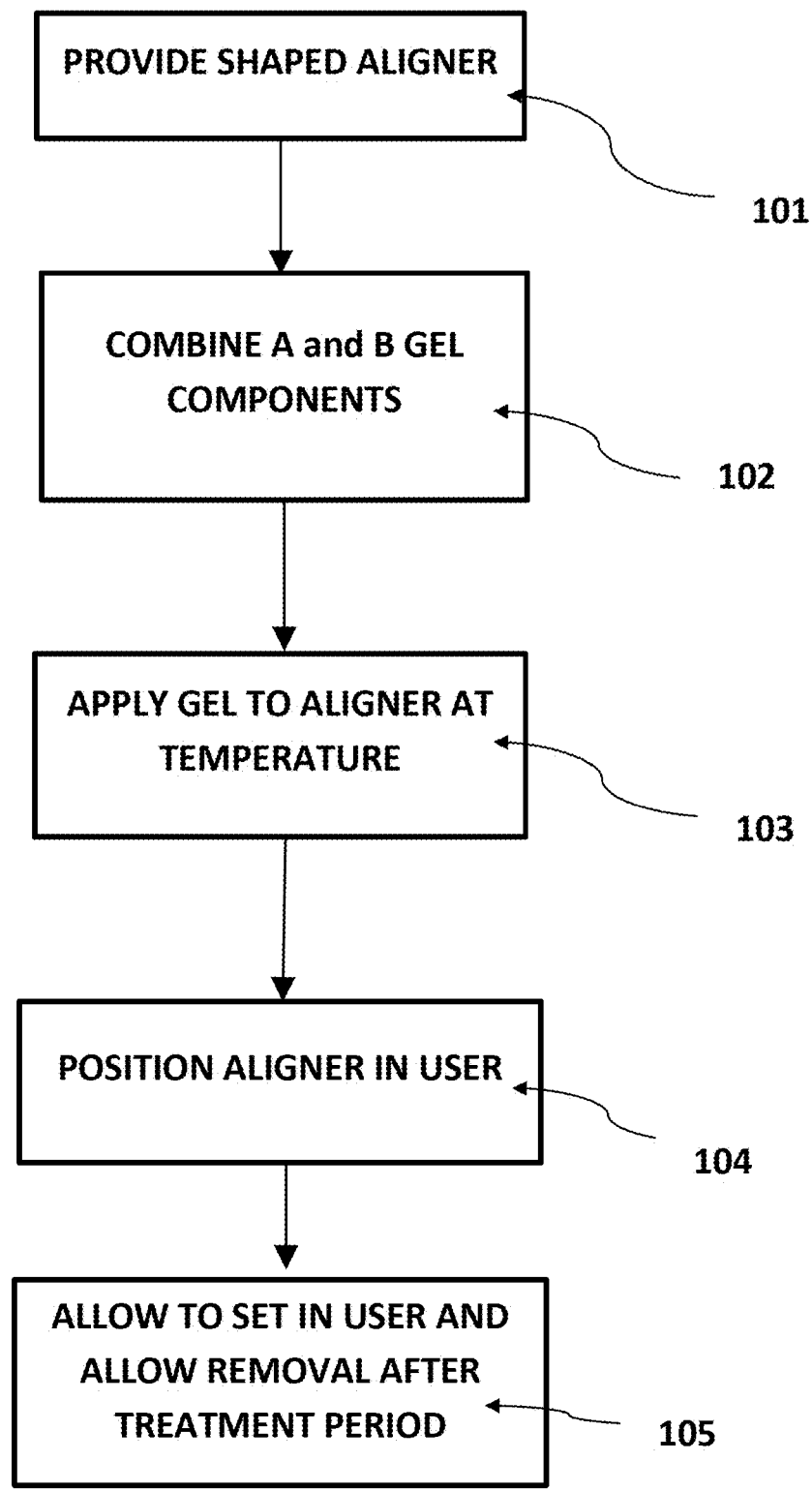

FIG. 5 illustrates a method of preparing an aligner system in accordance with an embodiment of the invention. At step 101, the aligner shaped based on the patient's teeth is provided. At step 102, gel component A and gel component B, when combined is configured to provide a gel which provides the force transfer gel layer 31. At step 103, the gel is applied to the aligner at a desired temperature such as around room temperature. At step 104, the aligner is inserted into and positioned within the mouth of the user by the orthodontist. At step 105, the aligner with gel is allowed to set over time and allowed to be removed after the treatment period is over.

Figures 6A, 6B:
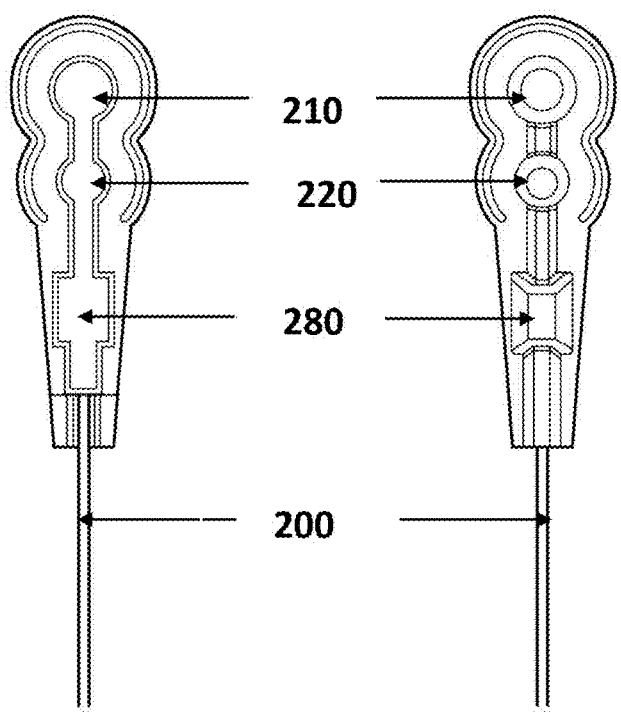
Figure 7A:
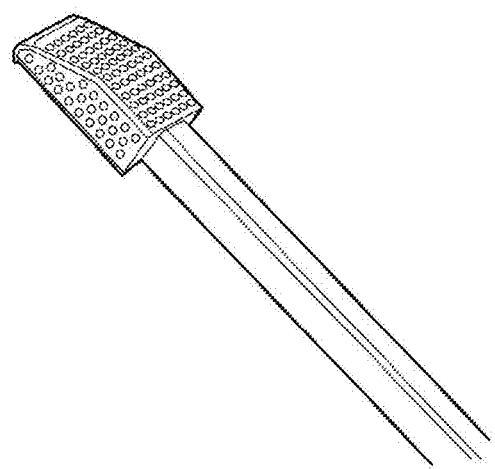
Figure 7B:
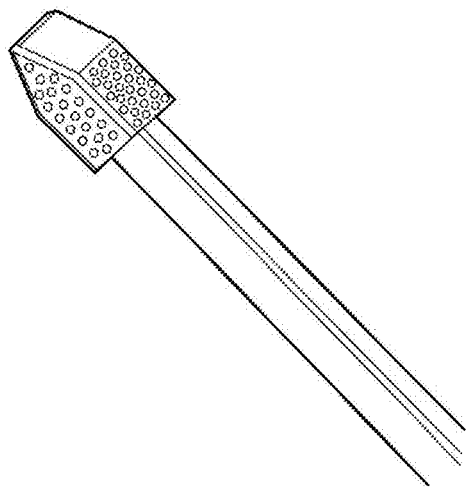

Referring to FIG. 7 FIG. 6A showing a front view (A) and FIG. 6B showing a back view (B) , there is shown a gel applicator 200 for applying a curable gel composition 31 to a teeth-engaging surface 25 of a dental straightening appliance 22. The applicator 200 can comprise a syringe barrel body providing a reservoir including two chambers 210, 220 separated by a divider. The chambers 210, 220 receive a predetermined amount of a curable polysiloxane gel composition base and a catalyst. The applicator further includes a mixing chamber 280 at one end of the reservoir, and a drive mechanism being a plunger at the opposite end of the reservoir for driving the curable gel composition base and a catalyst from the chambers to the mixing chamber.

As shown, the applicator further includes a dispensing end including a sponge (not shown) adjacent the mixing chamber and a scoring means made from bio-glass forming a tip.

As shown, in use the plunger promotes displacement of the gel and catalyst towards the mixing chamber for combining, and combined gel/catalyst is urged through the sponge for egress through the tip. During dispensing, the applicator is moved over the dental straightening appliance such that the scoring means contacts the surface of the dental straightening appliance in advance of gel front as the gel is liberated, to form a textured surface for adherence of the gel.

Example 1

In use, an orthodontist creates and shapes a set of customized removable thermoplastic aligners for a patient. Once these aligners are formed, a force transfer layer is formed by brushing a gel onto the inner surface of each aligner (e.g. using points of a gel applicator) and inserted onto the teeth.

Generally, there are several characteristics that occur:
1. The composition and properties of saliva does not significantly affect the ability of the gel to attach to the tooth enamel.
2. After setting at the room temperature such as the intraoral temperature of 37 C the following variations of temperature of 41 C to 55 C in situ due to hot or cold food or drinks does not significantly affect gel debonding Application of Gel to Aligner Interface
a) The gel is to be applied to the aligner. It also allows incubate of the gel to ensure it is dry before applying loads etc.

Materials:
a) Gel interface (Silpuran 2403 of Wacker AG)
b) 'Points_ disposable brush gel applicators (1)
c) Disposable dental mixing pots (2)
d) 1 ml syringe (3)

Procedure:
1. Using 1 ml syringes, take even parts of A and B and place in mixing pot.
2. Stir for 30 seconds using a point
3. Take the mix up in a syringe and turn upside down. Wait until all bubbles have settled to the top and push in syringe until gel begins to come out
4. Empty syringe into a pot
5. Dip the point into the gel and apply a thin layer to the aligner
6. Insert into patient
7. Allow to set.

This procedure for producing an aligner system of the invention allows forming of a first bond between the removable aligner and force transfer layer and a second bond between the force transfer layer and teeth, wherein the bond differential at the interfaces with the aligner and teeth are such that the force transfer layer will be preferentially retained by the aligner.

Example 2

In another example using the applicator of FIGS. 6 and 7, after the orthodontist creates and shapes a set of customized liners for the patient, the aligners must have the gel brushed evenly in a thin layer of a predetermined thickness onto the inside surfaces of the aligner and then inserted into the patient.

Under ambient temperature conditions, the time taken for curing of the gel composition is substantial. To speed up the time of curing and therefore the time that the patient can feel comfortable that the aligner is fully fitted, a heat-generating method is used. In this case the method uses the chemical reaction of dissolution of calcium chloride to provide the heat source.

At 55 C it takes 3.3 times quicker to set the gel to an equivalent cure state than at 37é C, the human intraoral temperature.

The completion of curing (cross linking) in situ (within the oral cavity) provides a bond strength between the force transfer layer of cured gel composition with the wearers teeth sufficient to remain on the teeth and transfer orthodontic force on the teeth from the aligner.

Example 3

In the third example with reference to FIGS. 8, 9, 10 and 11 there is a different heat-generating method allowing the gel composition forming the force transfer layer, to set out of the location on the teeth of the patient.

It is important for the sake of adhesion and teeth conformity that the gel composition must set with while on the teeth; otherwise, there will be a misfit if the gel cures completely before it is inserted onto the teeth.

Hence, in this example the gel composition was mixed and placed in a hot water bath at 55é C for 14.5 minutes; and, was applied onto the aligners using the scaffold-tip applicator. The aligners were fit onto the teeth of the patient and left to set for another 30 minutes.

It is evident that the gel composition almost immediately softens after being exposed to the heat-generating method; then undergoes rapid cure after about 6 minutes. In the soft state the gel can be rolled or shaped and then placed on the aligners rather than pasted onto the aligners.

Aligners

Clear, removable aligner systems are used to improve upon the limitations of fixed orthodontic appliances; but mainly for aesthetic reasons. The process involves generating impression scans of the patient's dentition, and a virtual three-dimensional Computer-Aided Design (CAD) and Computer-Aided Modelling (CAM) techniques to plan desired tooth movements and produce a set of fortnightly aligners. The aligners are designed to induce a maximum of 0.15 to 0.25 mm of tooth movement for each two-week period and are ideally worn for a minimum of 20 hours per day. The system has limited control over precise tooth movements; hence, it is complemented by attachment composites that are used as force transfer mediums for better tooth control.

Aligners are either digitally or manually made. They are a series of clear transparent polyacrylic plastic 'trays'. They can be made from patients dental moulds (either through poly vinyl siloxane (PVS) impressions or digital intra-oral scans). The series of aligners are custom-made to allow small increment of dental movement.

Even though the patient usually changes to a new set of aligners every 2-4 weeks (depending on which systems), the clear aligners are usually removed daily and only worn at least 20 hours per day. The patient removes the aligners to eat, floss and brush. Patients may have to remove them while drinking hot beverages and/or beverages that contain milk or sugar.

There is a potential space between the plastic aligners and the teeth. This space varies in different systems, around different teeth (incisors vs premolars vs molars), as well as different parts of the tooth (incisor edge vs maximum curvature vs gingival embrasure areas). If patients do not brush and floss their teeth well after each meal, and replaces the aligners on the teeth, there will be a marked increase in intra oral acidity, increasing the risks of dental decay and decalcification.

The aligners are generally a form of an acrylic, usually of polypropylene or polyvinylchloride (PVC) material. The three examples used are from the EXXIS ù range and comprise the 'ESSIX C+', 'ESSIX ACE' and 'ESSIX PLUS'. The C+ is formed primarily of Polypropylene, the ACE is formed of co-polyester of polyethylene terephthalate and the ESSIX plus is formed of an hybrid co-polyester.

To date aligners do not include any material but often have attachments on the teeth and matching shapings on the inside of the aligner. Therefore, a strong frictional fit occurs with aligners but this can require extensive force to the teeth as you must directly engage the teeth with the aligner.

Gel

The present invention uses a clear polysiloxane gel composition which is located between the teeth and the aligner to provide an advanced force transfer interface to the teeth. The gel which is sometimes called a 'biogel' is named not that it must be biologically derived; but it has to be biocompatible to the oral tissues.

The polysiloxane force transfer layer is a 2-paste system that is mixed when extruded in a 'gun-mixing tip' system. From the softer gel state, it then sets over about a minute in a combined chemical reaction accelerated with intra oral temperatures, into a semi solid state.

The gel is applied thin enough to perpetuate the potential space and undercuts of the teeth between the teeth and the aligners. It has to be firm in order to withstand intra oral pressures and forces. It demonstrates minimal creep to allow an extended intra oral usage without constant replacement.

As will be shown in tests described later the gel dampens the pressures and stresses that the original aligners have on the teeth prior the placement of the gel but may shrink slightly in dimension to enhance that force level. It is not too porous or permeable so as not to allow the blatant absorption of saliva and other liquids in the oral cavity. It does not 'lock in' the aligners and disallow simple removal of the aligners.

The biogel is easily applied onto a clean and dry aligner using the custom-made dispenser tip. After the insertion of the aligners, any excess should be easily cleaned out from the gums and surrounding soft tissues using a cotton bud or tissues before the initial set of the gel. The biogel adheres to the aligner and not the teeth when the aligners are removed. It is easily peeled off (from the aligners) and discarded at the end of its use. It is substantially biodegradable.

As the aligner system of the invention are worn all the time except eating and brushing, the biogel withstands an extended period of use. Ideally it is changed with every new aligner (2-4 weeks), but depending on dimensional changes and its ability to maintain consistent force levels over the test period, the biogel may need to be changed 2-3 times daily.

The biogel allows a seamless connection between the aligners and the teeth, transferring the forces originally designed and intended by the manufacturers of the aligner systems.

The aligner gel is applied using a syringe-type device that can accommodate a two-part gel component system that on mixing undergoes a cross linking-type reaction to yield a solid translucent film. This film functions to fill any gaps between aligner and teeth. Patient will typically wear aligner throughout the day and only require removing them for eating. The Aligner Gel will need to robust enough to withstand regular detachment/reattachment of the aligner/Aligner Gel composite device as required by the patient to follow their daily eating schedule.

Patients will need to perform the Aligner Gel protocol each time a new aligner is fitted (currently~every two weeks in accordance with the stepwise correction schedule dictated by the orthodontist/aligner manufacturer)

The aligners are preferably formed of a plastic material so as to enhance the effective differential adhesion bond strength of the first interface formed between the aligner and the oral adhesive so as to be greater than second interface between the oral adhesive and the patients teeth wherein the aligner is more readily removed with the oral adhesive from the patients teeth.

The Gel is more precisely called polymerized siloxanes or polysiloxanes, silicones are mixed inorganic-organic polymers with the chemical formula $[R_2SiO]_n$, where R is an organic group such as methyl, ethyl, or phenyl. These materials consist of an inorganic silicon-oxygen backbone ( ✛-Si—O—Si—O—Si—O-✛ ) with organic side groups attached to the silicon atoms, which are four-coordinate.

In some cases, organic side groups can be used to link two or more of these —Si—O— backbones together. By varying the —Si—O— chain lengths, side groups, and crosslinking, silicones can be synthesized with a wide variety of properties and compositions. They can vary in consistency from liquid to gel to rubber to hard plastic.

In its uncured state, silicone rubber is a highly-adhesive gel or liquid. In order to convert to a solid, it must be cured, vulcanized, or catalyzed. This is normally carried out in a two-stage process at the point of manufacture into the desired shape, and then in a prolonged post-cure process. It can also be injection molded.

Silicone rubber may be cured by a platinum-catalyzed cure system, as a condensation cure system. For platinum catalyzed cure system, the curing process can be accelerated by adding heat or pressure.

In one preferred form, the Gel is the Silpuran 2430 medical-grade, which has parts A and B and includes a catalyst (usually platinum) built into the system (in component A) to enact a room temperature vulcanization (RTV-2), triggered by the mixing of the equal parts of A & B.

There are 2 different types of RTV2 silicone rubbers:
- Addition cure systems which use platinum based catalyst.
- Condensation cure systems which use a tin based catalyst.

Silicone Rubbers cured with either system have very similar properties but there are some differences which is why Addition Cure Silicone (Platinum Based) is preferred.

The key differences and therefore the preference for an Addition Cure Silicone (Platinum Based) include:
- Low shrinkage, below 0.1%
- Marginally higher tensile strength
- Slightly tougher rubber
- Need for careful and accurate mixing
- Good abrasion resistance
- Can be accelerated using heat
- Tolerant to the addition of silicone fluid as a softener In use 5 ml of A and B Silpuran 2430 gel is used per mix. It amounts up to 0.8 g of gel used for each aligner. Initial mixing is done under 25↕ C and took 2.5 hours to set. In a different example mixing was done under 37↕ C and it took 1 hour to set.

The gel thickness is determined by the potential space between the aligner and the cast model. All excess will be extruded and discarded. However, it is important to provide an even thickness layer of gel. Therefore, use of the applicator allows treatment of the aligner to improve coarseness and to also allow ready quantity and thickness control of applied gel.

Applicator

Referring to FIG. 7, one form of applicator has a chisel shaped tip. In another form, there is a pencil shaped tip. The applicators have a scaffold at the tip to scratch the aligner to encourage the gel to have physical adhesion to the aligner.

Once the two components are mixed together in the mixing chamber, a sponge-tip applicator is used to apply the gel onto the aligners. An interconnective scaffold of 95% porosity from Biometic Pty. Ltd. is used as the sponge material due its high porosity and ability to remember its shape, allowing effective gel delivery.

The gel needs to be applied as evenly as possible to allow a uniform cure time and gel function. A chisel-shaped sponge tip and a pencil-shaped sponge tip (FIG. 6) were investigated to observe the influences of the sponge shape on the application of the gel onto the aligners.

The gel was more easily and evenly applied with the pencil-shaped tip for all the molar, premolar and canine-premolar sections. The flexibility of the scaffold allowed the pencil-shaped tip to fit into the smaller areas of canine-premolar sections;

However, the pencil-shaped tip was still too big to fit nicely into the incisor sections. The incisor sections of the aligner are more easily applied with the chisel-shaped tip solely due to its smaller width of the tip allowing the sponge to fit into the aligners.

It is more difficult to control the amount of gel present on the scaffold-tip. The pencil-shaped tip stores a greater volume of gel upon first application of the 1 mL, with minimal need of re-application and applies enough gel onto the convex areas of the aligners.

When using a heat generating system of dissolution of calcium chloride (as described further in later section), to minimise risks of calcium chloride reacting, the design of applicator with the calcium chloride and water chambers are separate from each other.

Figures 11A, 11B:
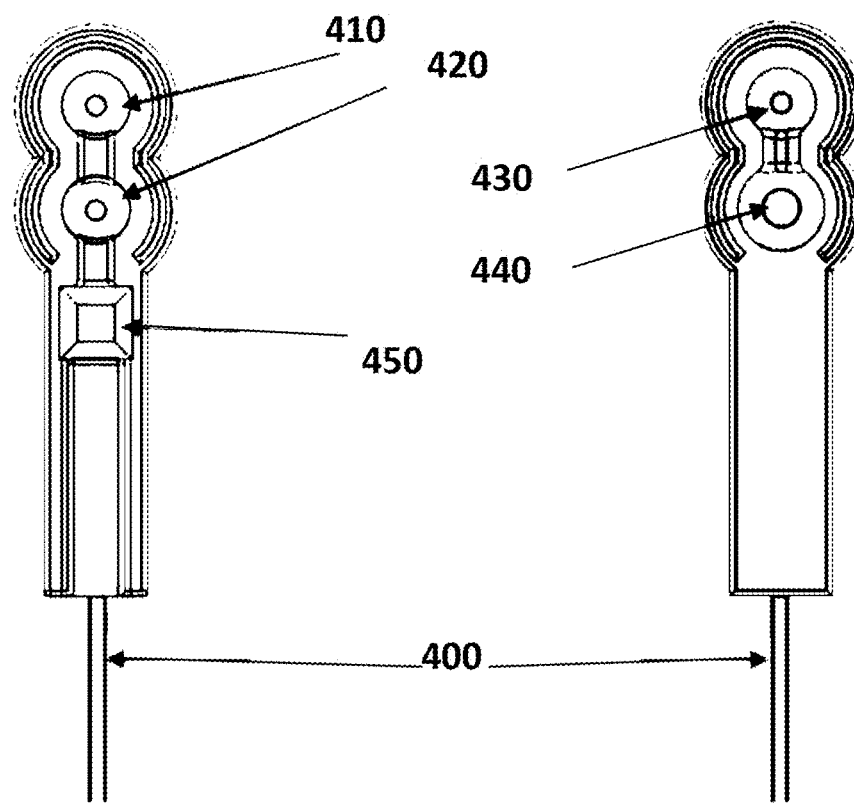

As shown in an enhanced embodiment of FIG. 11Figures 11A and 11B the design of the applicator (400) consists of two faces: front and back. The front face contains three chambers: two gel chambers (410, 420) and one slot to hold the sponge-tip applicator (450); and the back face contains two chambers: one chamber (430) for calcium chloride flakes and one chamber for thickened water (440). The coinciding surfaces of the front and back faces are fully sealed so that neither components of front nor back chambers leak into chambers on the other face. The back face is designed to generate and deliver heat to the lower gel chamber through calcium chloride dissolution.

In use, as the gel in the upper chamber is pushed into the gel in the lower chamber, the calcium chloride will also be pushed into the water chamber to induce a dissolution reaction, generating heat. A sponge tip applicator will then be soaked with uniformly mixed gel and evenly coat the inner linings of the aligners for the patient to wear.

A huge advantage of this applicator is that it is disposable and is very simple to use. As a result, it is hygienic, which is important as a medical product. The product is also very small, and the laminate/foil pouches used to make the chambers are readily available at low cost.

| No. | Requirement Description | Rationale |
|---|---|---|
| | Uniform Property | |
| 1.1 | Gel parts shall be mixed thoroughly | Gel interface must exhibit uniform property throughout. |
| | Biocompatibility | |
| 1.2 | Gel and activating materials shall be biocompatible. | Gel must not be harmful to the patient both locally and systematically. |
| | Aesthetics | |
| 1.3 | Gel shall be clear. | Gel system must be visibly superior over attachments of the Invisalign system. |
| | Applicator Function | |
| 1.4 | Gel can be easily applied with the applicator. | Gel should be evenly and easily applied with an applicator. |
| 1.5 | Applicator shall be capable of achieving the temperature required to accelerate gel cure time. | Gel cure time must be shortened for the aligners to be inserted shortly after gel application. |
| | Shelf Life | |
| 1.6 | Gel shall have a reasonable shelf life. | Gel must have a reasonable minimum shelf life to support the duration of treatment. |
| | Gel Adhesion | |
| 1.7 | Gel must preferentially adhere to the aligners than to the tooth. | Gel mast remain attached on the aligners to avoid patient discomfort and loss of gel volume upon insertion-removal cycles. |
| 1.8 | Aligners with gel can be easily removed. | Gel interface system must not adhere to the teeth too strongly that it prevents aligner removal. |
| | Bond Strength | |
| 2.1 | Gel function shall remain constant upon contact with saliva. | Water/saliva can reduce the frictional forces between the polymer chains, reducing the mechanical properties. |
| 2.2 | Gel shall not disintegrate at 37° C. in the mouth. | Gel must withstand intraoral temperature. |
| 2.3 | Maximum gel retention pull force must be greater than 17N. | Gel shall exhibit greater retention to aligners than with aligners with attachments. |

| No. | Requirement Description | Rationale |
|---|---|---|
| | Fatigue Resistance | |
| 2.4 | Gel shall not disintegrate upon 70 insertion-removal cycles. | Gel interface system with clear aligners are to be used by the patient for multiple 2 week periods. |
| | Force Transferability | |
| 2.5 | Gel volume shall remain at an appropriate level for triggering orthodontic tooth movement | Gel volume should not be lost between insertion and removal cycles. |
| 2.6 | Initial force applied by the gel shall not plateau after day 1. | Gel shall serve as a more consistent force transfer interface than Invisalign with attachment composites in which initial force quickly reaches plateau between day 2-14. |
| 2.7 | Gel shall provide at least 0.15-0.25 mm of displacement per tooth. | New gel interface system must provide tooth displacement that is at least as effective as the Invisalign system (maximum displacement of 0.15 to 0.25 mm per tooth). |

Benefits of System
¿ Gel formulation
¿ Setting time: How long does it take to set?
¿ Mechanical performance
¿ Ease of removal
¿ Minimal or no residual material on teeth post removal of aligner/gel device 1. Gel Benefits
Benefits of Gel Include:
¿ Gel layer is clear
¿ Gel can set within a reasonable time period and only applied as much gel as is necessary
¿ Gel has adequate shelf life as it is a stable gel and ensure remains so with additives
¿ Gel can be easily applied with user friendly and simple applicator
¿ Gel can be removed from aligner easily after use as the applicator spreads gel evenly, and additives ensure ready removal
¿ Gel does not smell unpleasant during use as additives are used which neutralise odours
¿ Gel does not discolor over time as it is an appropriate gel type which does not absorb pigments
¿ Gel remains intact upon multiple insertions and removals as binding agent is used which ensures even thickness when applied to teeth
¿ Gel preferentially adheres to aligner upon removal as using appropriate silicone for adhesive properties. Potential for appropriate additives.
¿ Gel does not discolor with common food stuffs as use appropriate gel type which does not absorb pigments The polysiloxane curable gel used to form the force transfer layer overcomes the drawbacks of the prior art by avoiding propensity of aligners to stain or discolor by forming an intermediate layer. The gel layer therefore provides an aesthetic advantage over prior art removable thermoplastic aligners, which overcomes primary reasons for patient delays in using orthodontic measures for teeth realignment purposes.

2. Setting Time Benefits
The temperature range at which the gel can be set in an adequate amount of time is of particular interest. The gel is to be applied onto the aligners and inserted into the mouth before it is completely set, to give it some time to set in shape with the dentition.

Therefore, the cross-linking rate of a silicone formulation and its extent of reaction are important factors that determine its performance in a coating. For instance, the extent of cure strongly affects the release and adhesion properties of silicone. Moreover, temperature greatly affects the curing time of silicone. It has been demonstrated that the cross-linking reactions in polymers under various temperatures can be effectively investigated using a Scanning Vibrating Needle Curemeter.

The human intraoral temperature, although usually at around 37é C, can spike up to 57é C upon consumption of hot food and drinks. In an investigation of the influences of temperature increases on the mechanical properties of thermoplastic aligners it has been found that the aligners effectively maintain its shape across the range of intraoral temperatures, but experiences a centralised stress above 56.5é C.

Figure 10:
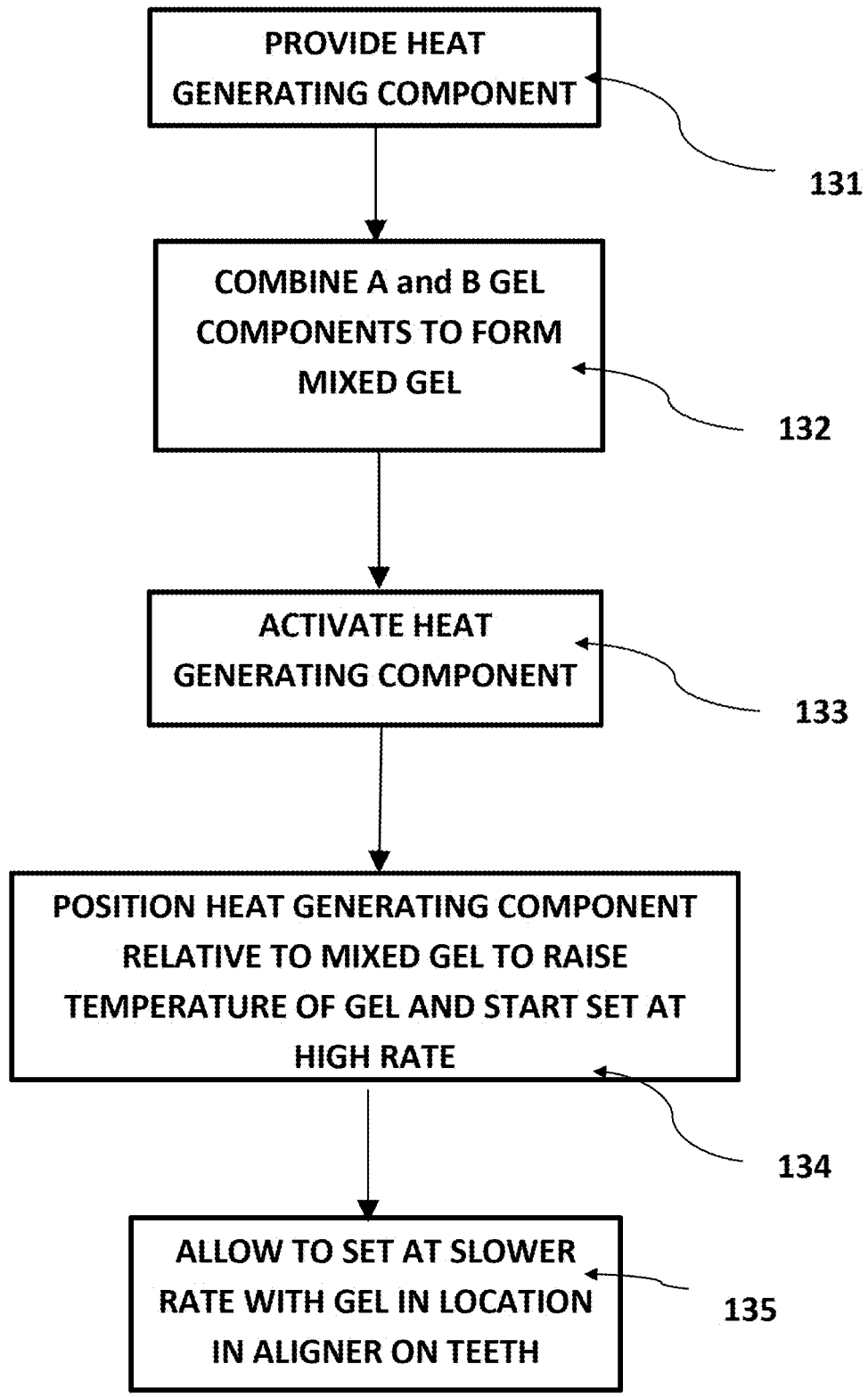

The gel cure time must be accelerated for the patient to be able to wear the aligners soon after application of the gel. Higher temperatures will speed up the gel cure rate. With reference to FIG. 10, the devised heat-generating method shall aim to achieve a temperature range that is high enough to accelerate the cure time but low enough to avoid any detrimental changes to aligner properties.

When using Silpuran A/B the cure times are as follows:

| % Cured | Time in minutes at 37 IC. | Time in minutes at 55 IC. |
|---|---|---|
| 1 | 2.4 | 0.5 |
| 2 | 3 | 2 |
| 5 | 5 | 3.8 |
| 10 | 21 | 6.8 |
| 20 | 30 | 9.5 |
| 50 | 41 | 12.5 |
| 80 | 47 | 14.5 |
| 90 | 52.5 | 16.5 |
| 95 | 60 | 17.5 |

Therefore, a heat-generating method is used to speed up the heat affected gel curing rate.

In one form, the heat-generating method to speed up the heat affected gel curing rate uses calcium chloride. In another form, the heat-generating method to speed up the heat affected gel curing rate uses a hot water bath.

The chemical 'calcium chloride_ was chosen as it is used as a heat source and is also widely used as moisture absorbers. Further it also is used in purer food-grade forms.

The molecular weight of anhydrous calcium chloride is 110.98 g/mol and 1 mol of pure calcium chloride exhibits a heat of enthalpy of −80 kJ/mol. Its characteristic to generate heat upon dissolution in water introduces some possibilities of it complementing the applicator system as a heat-generating component. By pure calculation, assuming that the heat capacity of water is 4.18 J/gé C, a 1:1 ratio of calcium chloride to water can raise the water temperature by 87é C. Similarly, 1:2 ratio can raise the temperature by 58é C and a 1:3 ratio can raise the temperature by 44é C.

Figure 8:
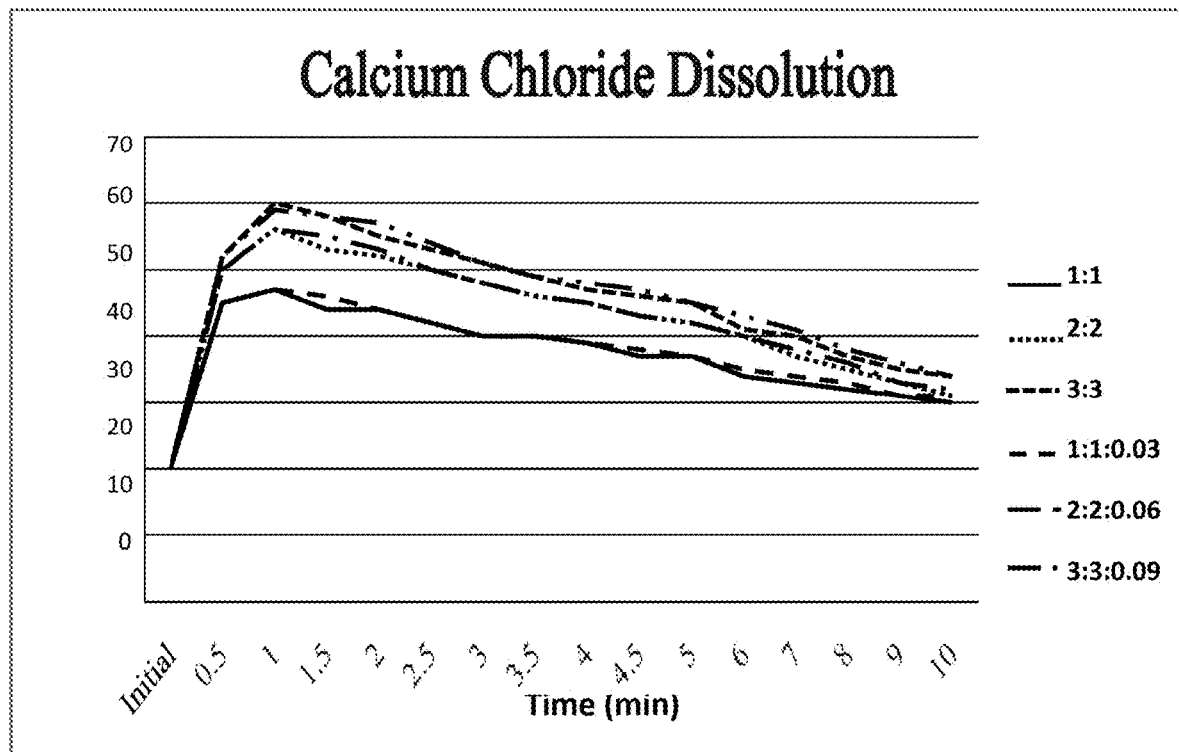

According to these results, calcium chloride dissolution is more than capable of generating enough heat to accelerate the gel set time. The quickness and effectiveness of heat generation by dissolution of calcium chloride is shown in FIG. 8.

Figure 9:
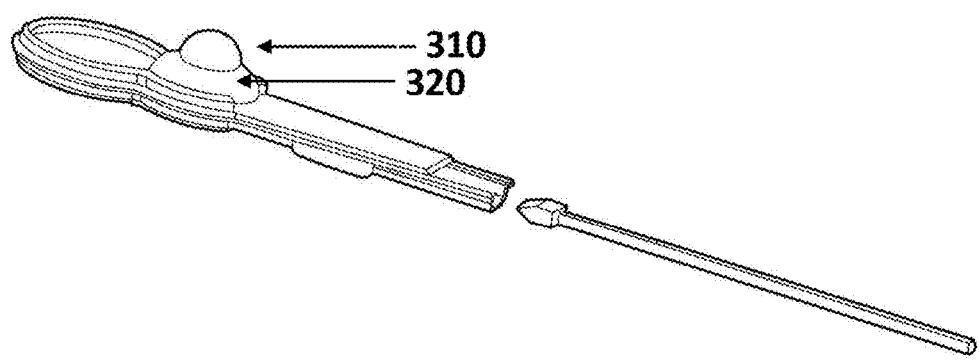

This system is therefore incorporated into one form of applicator as shown in FIG. 9. In this form, the design of the calcium chloride is with cough tablets in mind - sealed packets 310 that break as calcium chloride flakes are "pushed" into the water chamber 320 to activate the heat generating chemical process of dissolution of calcium chloride. By location of this chemical reaction next to but separate to the mixing of the gel components the mixed gel at a higher temperature can be applied by the applicator to the aligner and inserted onto the teeth of the patient to allow setting in situ.

Controlling the setting time of the force transfer layer apart from significantly reducing fitting time for a patient, allows in-situ formation of an adhesion bond between teeth and curable gel layer of the aligner system. The extent of the adhesion bond between teeth and gel layer can be controlled by modifying the gel composition, however it is critical that there is an adhesion differential between the aligner and gel interface and teeth and gel interface to maintain retention bond to teeth in use, and allow preferential removal of the gel layer from the teeth upon removal of the aligner system with minimal enamel damage or residual gel layer on the teeth.

In the enhanced form of FIG. 11 the dissolution of Calcium chloride is more readily achieved in a controlled and sealed manner to allow the heat treated combined gel components to form a gel layer with the applicator on the inner surface of the aligner and form the OTM force transfer means.

Figure 12:
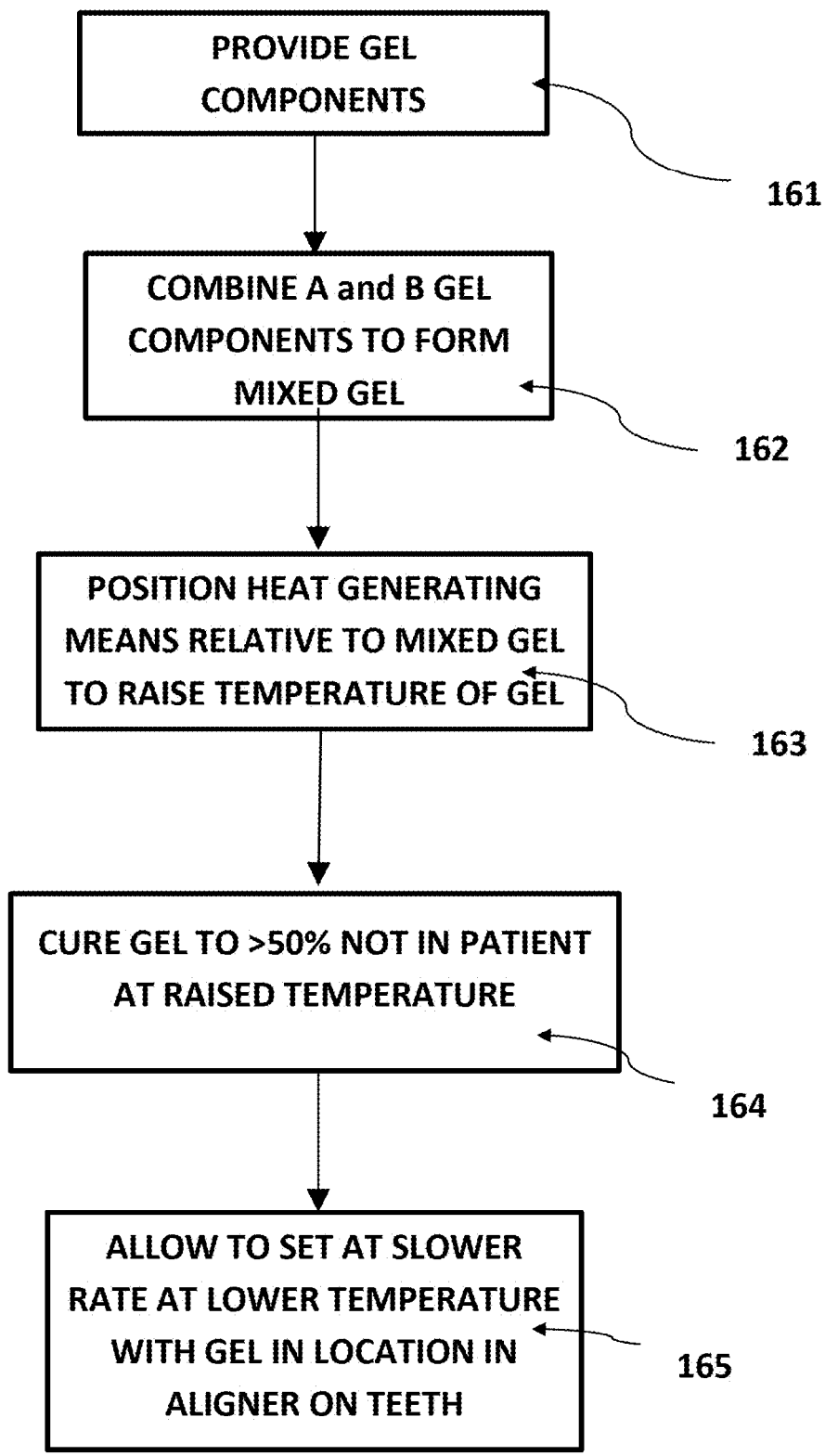
Figure 13:
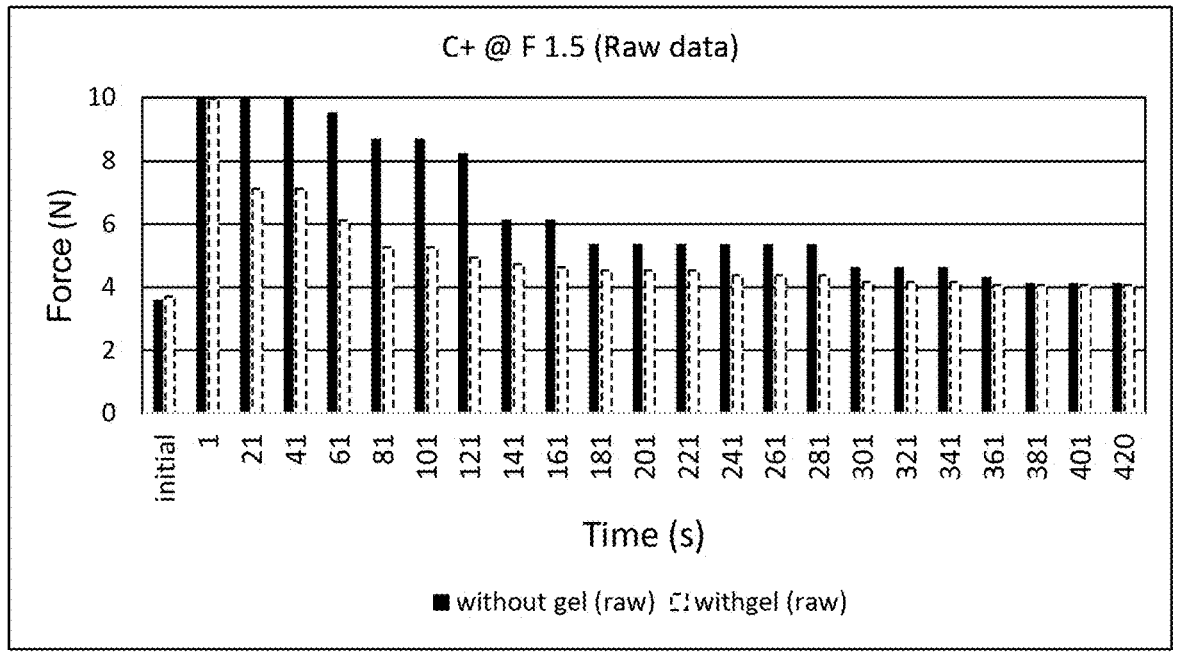
FIG. 13 show graphical results of force transfer exerted by aligner system of the invention with time on front teeth surfaces using a first aligner of C+ type with 0.77 grams of gel forming gel layer versus control aligner without gel layer.
Figure 14:
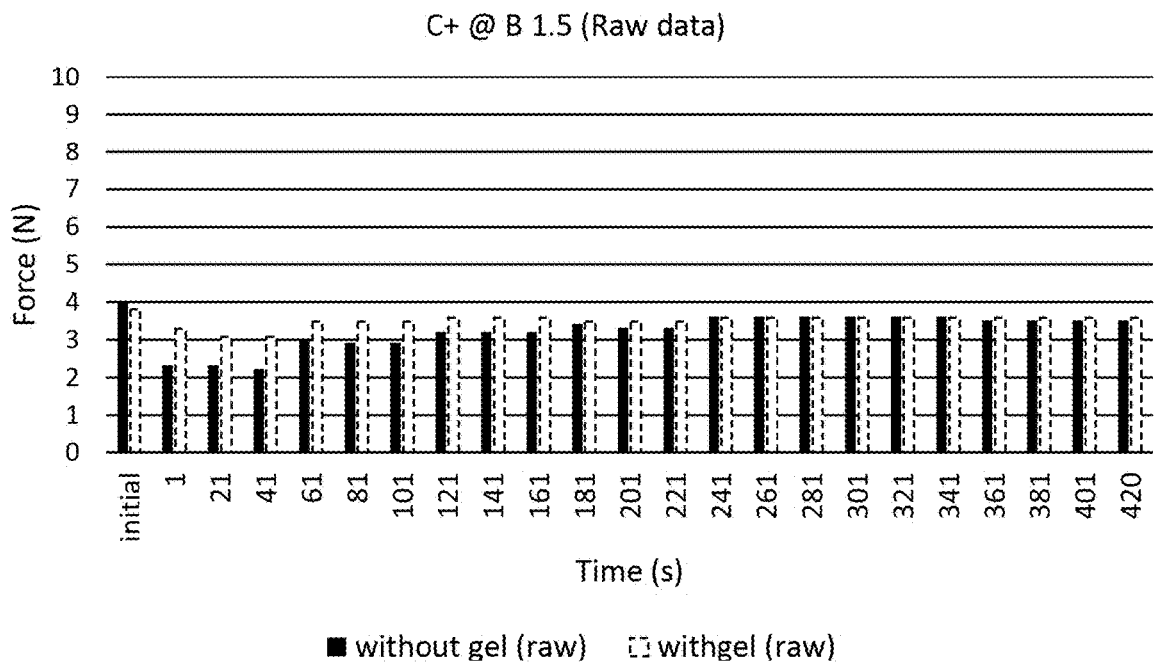
FIG. 14 show graphical results of force transfer exerted by aligner system of the invention with time rear teeth surfaces using a first aligner of C+ type with 0.77 grams of gel forming gel layer versus control aligner without gel layer.
Figure 15:
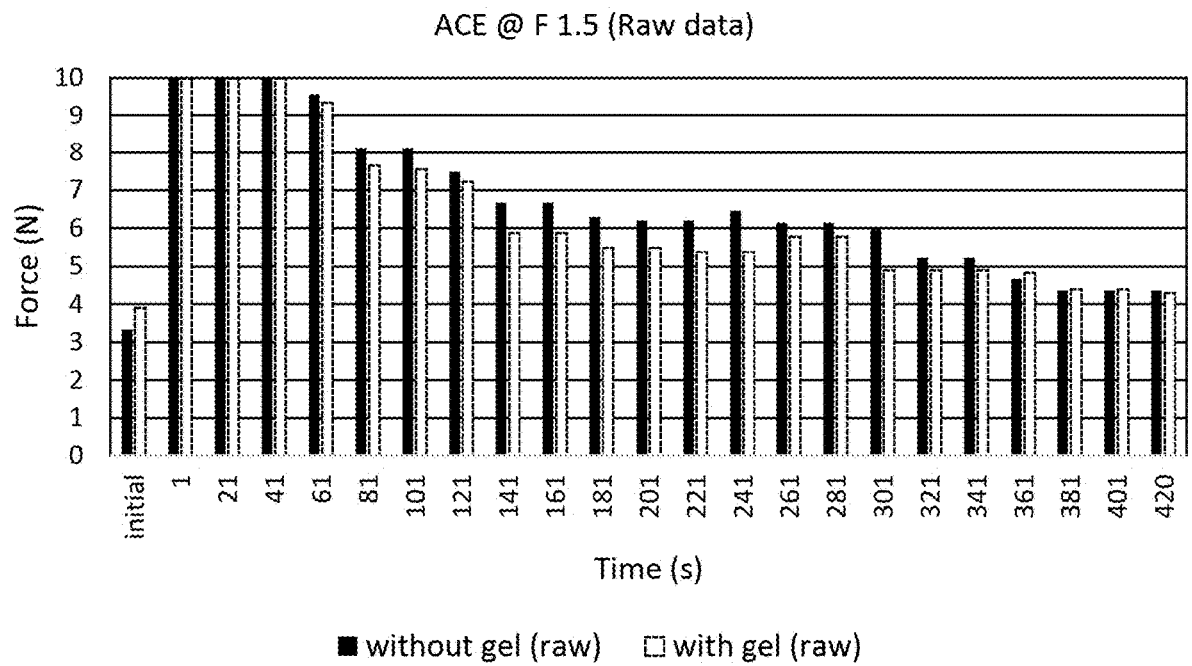
FIG. 15 shows graphical results of force transfer exerted by aligner system of the invention with time on front teeth surfaces using a first aligner of ACE type with 1.14 grams of gel forming gel layer versus control aligner without gel layer.
Figure 16:
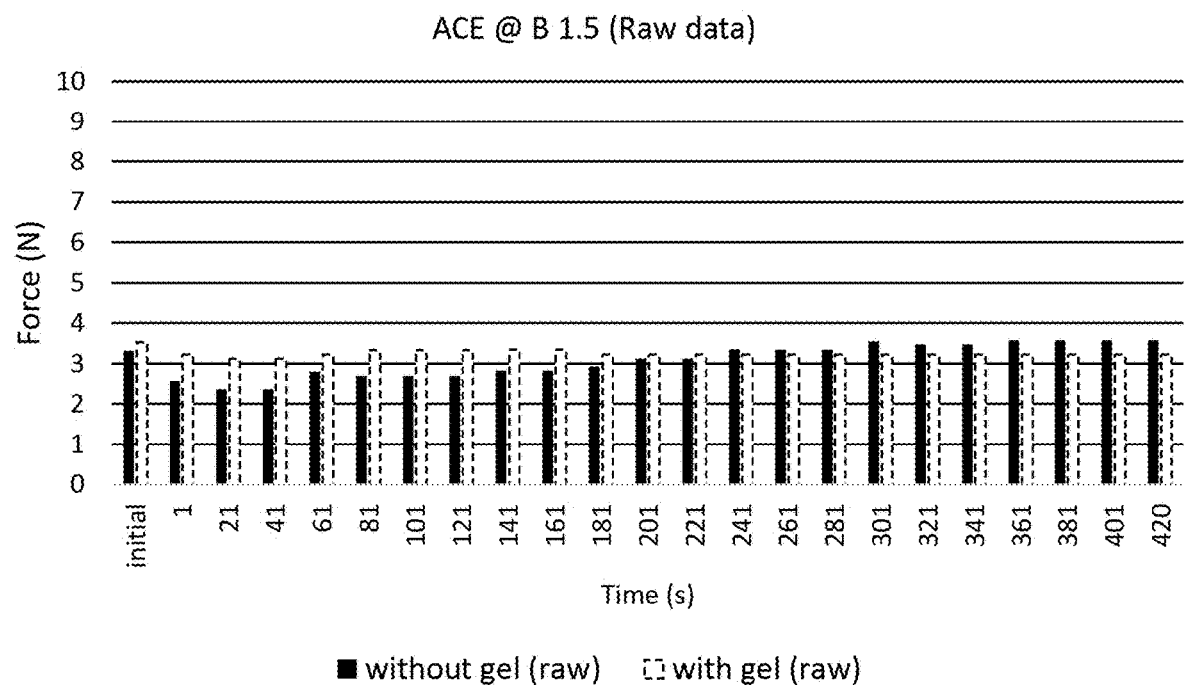
FIG. 16 shows graphical results of force transfer exerted by aligner system of the invention with time on front teeth surfaces and rear teeth surfaces using a first aligner of ACE type with 1.14 grams of gel forming gel layer versus control aligner without gel layer.

With reference to FIG. 12, the gel is a heat curable material and is able to have the setting of the gel is undertaken for a predetermined time on the aligner external of the patient and the remaining setting of the gel in location in the OTM fitting position in the patient to provide the shaped form to correspond with the aligner and/or teeth of the patient to provide a minimalist thickness gel layer. At step 161 the gel components, A and B are provided. At step 162, the gel components A and B are combined to form a mixed gel. At step 163, heat generating means are positioned relative to the mixed gel to raise the temperature of the gel. At step 164, the gel mixture is greater than 50% cured. The curing of the mixed gel for the predetermined time on the aligner external of the patient during the setting period is greater than 50% but less than 85%. At step 165, the gel is allowed to fully set at a slower rate at a lower temperature. The shaping and spacing of the aligner from the teeth by the gel layer and the resilient nature of the gel layer allows for ready cyclic removal and insertion daily with effective replacement into OTM fitting position on the teeth of the patient.

3. Mechanical Performance—Force/Compression

In orthodontics, forces are applied either continuously, continuously interrupted or intermittently. Traditionally, continuous forces have been incorporated to produce a constant mechanical stimulus on orthodontic appliances. These types of forces resorb alveolar bone and form new bone layers in the open marrow spaces in the periodontal ligament (PDL) tension sites at the termination of tooth movement. As a result, continuous forces are often regularly interrupted by the orthodontist to allow tissues the time for reorganisation in the PDL tension sites, ultimately triggering favourable tooth alignment Continuously interrupted forces appear to induce biologically favourable tooth movement due to its ability to quickly reduce force as the PDL hyalinises and cell necrosis occurs, supporting ideal paradental reconstruction with minimal tissue damage.

FIGS. 13 to 19 illustrate the force vs time characteristic of continuous interrupted orthodontic force. It is intuitive that the declining force magnitude needs to be reactivated to its initial level with constant interruption in order to achieve ongoing satisfactory orthodontic tooth movement (OTM). As the gel is not solid, it expresses physical deformation as the aligners were inserted. Hence a 'continued' test allow its expression over time. This allowed us to study the force decay of the system; measuring the peak insertion force, and further normalising to a mean reading. Preliminary experiment had the gel set in-situ, the thickness of the gel affected the results. Subsequent experiment had the gel set with a clamp in place. This allowed an even thick layer standardised for all aligners.

Traditionally, "light" orthodontic forces have been assumed to be more physiologically effective than "heavy" forces due to their ability to increase cellular activity and prepare tissues for further changes without causing unnecessary tissue compression. On the other hand, heavy forces can often cause hyalinisation of PDL, triggering root resorption.

Other studies have developed a more detailed relationship between the magnitude of the applied force and the extent of tissue reaction. Iwasaki et al. [42] suggest that all forces above a certain threshold results in the same rate of tooth movement. Hixon et al. [43] suggest that after a certain threshold, higher forces are more efficient in tooth movement. Others oppose this and suggest a differential theory, which describes a linear relationship between the rate of tooth movement and the magnitude of applied force up until a certain threshold, at which a further increase in force magnitude causes a steep decline in the remodelling rate. According to the theory, low forces should be used for space closure as higher forces induce PDL hyalinisation and delay tooth movement. Another model shows that a plateau is reached after a certain threshold rather than a sharp decline.

These findings highlight that there is no absolute relationship between the magnitude of applied orthodontic force and rate of tooth displacement, nor is there an absolute threshold of applied force that dictates the rate of tooth movement. Rather, different tooth movement will be reached within a broad range of forces.

Referring to FIGS. 13 to 18, there is shown comparative applied force decay measurements on front and back teeth. The graphs identify terms F1.5 and B1.5.

¿ F: is the force moving the teeth forwards
¿ B: is the force moving the teeth backwards 1. When testing the aligner system comprising removable aligner and gel force transfer layer, the aligner system in a jig (see figure xx), peak force was less than the conventional aligner (without the gel layer) but maintained the force over 420 seconds—this proves the gel layer can be added without inhibiting the removable aligner and potentially promote the fatigue resistance of the aligner with time;

2. The gel liner in the aligners can help reduce the peak force at the beginning and keep the force until the end. This means at the beginning of a three-week surgery—the patient will experience less pain by using aligner with gel; and 3. The aligners with the gel had the same displacement as the aligners without gel and kept the force throughout the whole period.

Again, for ESSIX PLUS, with gel layer one on backward tooth has higher force at the end compared to aligner (without gel).

From a peak limit measured for the jig the gel liner consistently applied force to the end of the tooth displacement sequence—often being equivalent to or higher in force transferred by the no gel brace.

With these observation, the gel liner in the aligners helps reduce the peak force at the beginning, and keep the force until the end. This means at the beginning of a three-week surgery, the patient will experience less pain by using aligner systems of the invention (with gel layer), and the aligner system continues apply force on the teeth after three weeks. The aligner system of the invention (with gel) can move the same displacement as the conventional aligner (without gel), and keep an orthodontic force throughout the whole period.

For ESSIX ACE and ESSIX PLUS which shows higher force at the end, the gel on these aligners (around 1 gram) are thicker than the gel on ESSIX C+ aligner (0.8 gram). This means the force remains at the end may proportional to the thickness of the gel.

| Max force | C+ | ACE | PLUS |
|---|---|---|---|
| no gel | | | |
| 1 | 10.9 | 19.8 | 13.9 |
| 2 | 7 | 18.1 | 12.9 |
| 3 | 5.9 | 15.1 | 11.1 |
| Average | 7.933333 | 17.66667 | 12.63333 |
| with gel | | | |
| 1 | 11.2 | 23.5 | 17.1 |
| 2 | 8.8 | 22.3 | 16.8 |
| 3 | 6.3 | 21.7 | 16.4 |
| Average | 8.766667 | 22.5 | 16.76667 |
| with saliva | | | |
| 1 | 9.5 | 22.4 | 16.3 |
| 2 | 8.1 | 22 | 14.9 |
| 3 | 6.8 | 20.6 | 14.6 |
| Average | 8.133333 | 21.66667 | 15.26667 |

These tables above and corresponding force decay results shown by graphs of FIGS. 13 to 18, confirms that the peak force for the aligner system of the invention is increased compared to conventional aligners but decreases relatively rapidly to a plateau force which is maintained for the length of the test. In essence therefore initial pain is quickly mitigated while effective force transfer occurs to provide the OTM force required and allow ready cyclic use by removal and replacement from and to an OTM position in the patient by the patient.

Clearly, the aligner system with gel exhibits a varied initial and changing force than conventional aligner (without gel). The rapid decline from peak force to plateau force for the aligner system supports the view that the gel layer transfers a sufficient OTM force from the aligner but minimizes the length of time a patient is exposed to high/peak forces as a result of a compressive characteristic of the gel layer, i.e. the gel layer moves in-situ to adhere to the teeth and match the configuration of the aligner.

Results from cycle testing (see FIGS. 22 to 24) shows force decay with 70 cycles of removal and insertion of the aligner system. As shown the force decay results indicate high (peak) initial force followed by consistent OTM force retention on teeth by the aligner system with 70 cycles.

4. Ease of Removal—Comparative Adhesion

In this case, comparative adhesion refers to the preferential bonding of the gel to the one surface over another. This preference will most likely depend on the surface texture and wettability of the interfaces. If the gel is found to adhere to the teeth, this will be problematic to both the safety and efficacy of the device.

In this study, samples of the gel interface were split into groups and placed upon the two different surfaces to be tested. The bonding strength between the gel interface and test surface will be measured quantitatively and qualitatively as well as being compared between groups. The silicone (Wacker AGs Silpuran 2403) will be applied to the test surface and cured outside of the human mouth environment in order to mimic the conditions in which the proposed gel will be used by the patient in the market.

The test of comparative adhesion looked at which surface, of the teeth or the aligner, the gel preferentially adheres. To show this comparative adhesion there were used 5 tests.

Test 1: Conventional Aligner—No Gel Control Test

Instron 5567 Universal Testing Machine was used to pull each aligner off the teeth in a direction perpendicular to the occlusal plane. The pull out force was recorded as the retentive force of the aligner; and, the pull out speed was set at 1 mm/s to investigate the worst case scenario of aligner removal. The test was repeated 3 times per test group and an average pull out force for each group was calculated.

Test 2: Aligner System (with Gel Layer)

The gel must set with the teeth; otherwise, there will be a misfit if the gel cures completely before it is inserted onto the teeth. Hence, the gel was mixed and placed in a hot water bath at 55é C for 14.5 minutes; and, was applied onto the aligners using the scaffold-tip applicator. The aligners were fit onto the matching mock jaw and was left to set for another 30 minutes before conducting the pull test.

Pull out tests were conducted in an identical manner to Test 1. The removed gel-aligner set and the teeth surfaces were then visually inspected to record whether any gel residues were left on either of the test surfaces. The gel was mixed with a hint of red silicone pigment for ease of visual inspection.

Test 3: Aligner System (with Gel Layer) and Saliva

For the saliva groups, 1 mL of 37é C water was carefully spread over the teeth before the aligner with gel was fit.

Gel preparation and application process, as well as the pull out test, were conducted in an identical manner to Tests 1 and 2.

Test 4: Micro-Scratching (Gel and Saliva)

Referring to FIG. 25, it is shown that in each removal test, a significant increased removal force is required for the aligner system compared to a conventional aligner. The greatest removal force was shown for etched bioglass aligner surface before application of the gel layer. Similar forces for removal were observed for composite gel layer including sintered sand.

In summary table therefore the comparative adhesion to the aligner rather than the teeth is shown by Table below showing Pull-out adhesion parameters for mock jaw 1 aligners with gel:

| Mock jaw 1 | Average max force (N) | % increase/ decrease | Adhesion to aligner (n/3) | Adhesion to teeth (n/3) | Residue area |
|---|---|---|---|---|---|
| Essix C+ | 24.1 | +6.6 | 1/1 | 1/1 | Between teeth, occlusal |
| Essix ACE | 35.8 | +23.9 | 3/3 | 2/3 | Between teeth, occlusal |
| Essix PLUS | 26.5 | +7.3 | 3/3 | 2/3 | Between teeth, occlusal |

In Table below of Pull-out adhesion parameters for mock jaw 2 aligners with gel showing significant increase in pull out force for aligner system for each conventional aligner

| Mock jaw 2 | Average max force (N) | % increase/ decrease | Adhesion to aligner (n/3) | Adhesion to teeth (n/3) | Residue area |
|---|---|---|---|---|---|
| Essix C+ | 8.7 | +10.1 | 3/3 | 1/3 | Between teeth, and occlusal |
| Essix ACE | 22.5 | +27.8 | 3/3 | 2/3 | Between teeth, and occlusal |
| Essix PLUS | 16.8 | +33.3 | 3/3 | 2/3 | Between teeth, and occlusal |

Table 15. Pull-out adhesion parameters for mock jaw 1 aligners with gel and saliva showing significant increase in pull out force for aligner system for Essix ACE conventional aligner

| Mock jaw 1 | Average max force (N) | % increase/ decrease | Adhesion to aligner (n/3) | Adhesion to teeth (n/3) | Residue surface |
|---|---|---|---|---|---|
| Essix C+ | 22.9 | +1.3 | 3/3 | 0/3 | N/A |
| Essix ACE | 31.4 | +8.7 | 3/3 | 0/3 | N/A |
| Essix PLUS | 24.3 | −1.6 | 3/3 | 0/3 | N/A |

Table 16. Pull-out adhesion parameters for mock jaw 2 aligners with gel and saliva showing significant increase in pull out force for aligner system for each conventional aligner

| Mock jaw 2 | Average max force (N) | % increase/ decrease | Adhesion to aligner (n/3) | Adhesion to teeth (n/3) | Residue surface |
|---|---|---|---|---|---|
| Essix C+ | 8.1 | +2.5 | 3/3 | 0/3 | N/A |
| Essix ACE | 21.7 | +23.3 | 3/3 | 0/3 | N/A |
| Essix PLUS | 15.3 | +21.4 | 3/3 | 0/3 | N/A |

Results shown in FIG. 26 show the following:
1. Equal adhesion for (i) gel layer and aligner, and (ii) gel layer and teeth for gel layer comprising sintered sand composite gel;
2. 90% adhesion for gel layer and aligner, and 55% adhesion for gel layer and teeth for aligner system
3. 100% adhesion for aligner and gel layer in presence of saliva;
4. 100% adhesion for aligner and gel layer, 10% adhesion to teeth for bioglass etched aligner surface.

The results of the adhesion tests show a desirable preferential adhesion between interface of gel layer and aligner and gel layer and teeth is achieved for the aligner system. This is achieved by controlling the first and second bond formed between the gel layer and aligner and gel layer and teeth, allowing removal of the aligner system without leaving gel layer on the teeth.

However, this is also changeable depending on the components used in the gel layer and/or the nature of the aligner surface.

5. Minimal or No Residual Material on Teeth Post Removal of Aligner/Gel Interface This is shown by the experiments and supports that the use of the gel layer as a force transfer means allows ready OTM treatment while minimizing or nearly eliminating any surface damage to the teeth. It still allows ready cyclic removal and replacement to the OTM position by the patient in daily routines to allow cleaning of teeth.

In Use

The method of applying an aligner in a required temporary set position within the oral cavity of a patient the method includes the steps of:
a. providing an aligner for use with a patient, wherein the aligner has a modified textured teeth-engaging surface;
b. applying an oral gel layer to a surface of polymeric material of the aligner comprising an interior surface to receive at least a portion of one or more teeth of the patient when the aligner is worn;
c. curing the curable adhesive, the curing comprising after the applying to the curable adhesive of a light source sufficient to cause the curable adhesive to cure to form a cured product bonded to the surface of the polymer material;
d. the curable acrylic adhesive comprising:
e. a polysiloxane is the aligner gel which is Silpuran 2430 which falls within compounds having the general formula 1 below

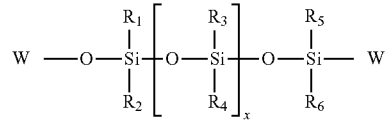

f. And an initiator.

The aligner gel can include constituent components of calcium fortifier.

The aligner gel can further include constituent components of an antibacterial agent.

It can be seen that the invention of an aligner with gel layer provides the benefit of the gel being a mechanical-coupling interface between clear aligner systems and the teeth upon which they sit. The gel does not harbour unwanted bacteria is essential if the product is to be used safely in a patient s mouth. The gel does not promote anomalous growth of select organisms in the patients mouth.

The gel layer is biocompatible to the oral tissues. It is preferably a two-paste system that is mixed when extruded in a 'gun-mixing tip' system. From the softer gel state, it then sets over about a minute in a combined chemical reaction accelerated with intra oral temperatures, into a semi solid state.

The gel is thin enough to perpetuate the potential space and undercuts of the teeth between the teeth and the aligners. It is firm in order to withstand intra oral pressures and forces. The gel demonstrates minimal creep to allow an extended intra oral usage without constant replacement. It should not dampen the pressures and stresses that the original aligners have on the teeth prior the placement of the gel but may shrink slightly in dimension to enhance that force level. It should not be too porous or permeable to allow the blatant absorption of saliva and other liquids in the oral cavity. It should not 'lock in' the aligners and disallow simple removal of the aligners.

The gel layer of the invention is easily applied onto a clean and dry aligner appliance using the custom-made dispenser tip. After the insertion of the aligners, any excess gel can be easily cleaned out from the gums and surrounding soft tissues using a cotton bud or tissues before the initial set of the gel. The biogel adheres to the aligner and not the teeth when the aligners are removed. It is easily peeled off (from the aligners) and discarded at the end of its use, and can be biodegradable.

As the aligners are worn all the time except eating and brushing, the biogel withstands an extended period of use. It is changed with every new aligner (2-4 weeks), but depending on dimensional changes and its ability to maintain consistent force levels over the test period, the biogel may need to be changed 2-3 times daily.

The gel layer of the invention allows a seamless connection between the aligners and the teeth, transferring the forces originally designed and intended by the manufacturers of the aligner systems.

It negates the need for attachment placement completely. This improves the aesthetics of clear aligner systems, improves the patient experience with any clear aligner systems, decreases the chair time and costs of the clinician and prevents the damage to the enamel when the attachments are removed.

The gel avoids hypersensitivity and allergic reactions.

With prolonged aligner wear, the buffering effect of saliva neutralising the oral acids is reduced. This increases carious incidences and leads to higher chances of enamel decalcification. The biogel may be incorporated with a Fluoride releasing and/or tooth mousse CPAP calcium phosphorous remineralisation agent to negate that effect.

Benefits of System

It is clear there is a synergistic benefit in the combination of features

These benefits include:
¿ Ideal aesthetics
¿ Removable
¿ Force application on all tooth surfaces
¿ Less pain responses
¿ Better oral hygiene
Interpretation

EMBODIMENTS

Reference throughout this specification to 'one embodiment_ or 'an embodiment_ means that a particular feature, structure or characteristic described in connection with the embodiment is included in at least one embodiment of the present invention. Thus, appearances of the phrases 'in one embodiment_ or 'in an embodiment_ in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it is appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives 'first_ , 'second_ , 'third_ , etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word 'comprise_ or variations such as 'comprises_ or 'comprising_ are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Industrial Applicability

It is apparent from the above, that the arrangements described are applicable to the dental, orthodontic and other specialist medical, dental and surgical industries.

The invention claimed is:

1. A teeth aligner system providing orthodontic tooth movement (OTM) for use in assisting corrective realignment of a patient's teeth, the aligner system including:
   a. a removable thermoplastic aligner having a teeth receiving cavity with a teeth aligning surface formed as an inner surface of the teeth receiving cavity;
   b. a transparent force transfer layer formed on the teeth aligning surface comprising a curable gel engaging between the teeth aligning surface and the patient's teeth, enabling a separation and spacing of the aligner from the teeth while providing a force transfer mechanism from the removable thermoplastic aligner to the teeth when in located in a required OTM fitting position on the teeth of the patient to provide an effective OTM force on the teeth;
   c. wherein the curable gel and the thermoplastic of the aligner are selected to provide a comparative difference of adhesion bond between the cured gel and thermoplastic aligner and the cured gel and the patient's teeth allowing ready removal of the aligner without damage to the teeth and ready repositioning to the OTM fitting position.
   d. wherein a polysiloxane composition is applied to the teeth aligning surface of the removable thermoplastic aligner and allowed to partially cure so as to form an adhesive bond with the patient teeth surface, and wherein an opposite surface of the polysiloxane composition, allows comparative weaker adhesive bond to the patient's teeth surface, allowing preferential removing of the aligner from the teeth without removing tooth enamel, and
   e. wherein the teeth aligning surface includes a surface texture formed by an applicator as the polysiloxane composition is applied onto the teeth engaging surface of the removable thermoplastic aligner.

2. A teeth aligner system according to claim 1, wherein the gel, upon completed curing of the gel, forms a first bond with the thermoplastic of the teeth aligning surface of the aligner and a second bond with the enamel surface of the teeth of the patient.

3. A teeth aligner system according to claim 2 wherein the applicator is adapted to etch the surface of the removable thermoplastic aligner, wherein the surface texture is formed by a series of grooves wherein the grooves are effective for gripping a surface of the teeth when the removable thermoplastic aligner is worn by a patient.

4. A teeth aligner system according to claim 1, wherein the transfer layer conforms to the teeth location configuration of the aligner and provides effective cushioning of initial orthodontic realignment force while able to maintain a minimal force over time and multiple removal cycles effective for realignment of teeth.

5. A teeth aligner system according to claim 1, wherein the first and second bond formed between (i) the transfer layer and aligner and (ii) the transfer layer and teeth, respectively, allows retention of the aligner system on the wearer's teeth and removal of the aligner without damage to tooth enamel following removal of the aligner.

6. A teeth aligner system according to claim 1, wherein an upper surface of the gel layer opposite the lower surface provides an attachment surface for attachment to the teeth and allowing easy removal of the removable thermoplastic aligner from the wearer's teeth without detaching the gel from the removable thermoplastic aligner while minimising damage to tooth enamel during the removal process.

7. A teeth aligner system according to claim 1, wherein the clear gel is located between the teeth and the aligner to provide an advanced force transfer interface to the teeth.

8. A teeth aligner system according to claim 1, wherein the combination of the removable thermoplastic aligner and the gel layer are clear and the preferential adhesion of the gel layer to the thermos plastic aligner over the adhesion to the teeth allow damage-free removal from the teeth after use.

9. A teeth aligner system according to claim 8, wherein an effective differential adhesion bond strength can have the ratio of bond strength formed at the first interface formed between the aligner and the transparent force transfer layer and the second interface between the transparent force transfer layer and the patient's teeth of between about 3:1 to 10:1.

10. A teeth aligner system according to claim 1, wherein the inner surface of the gel layer and a textured surface portion of the removable thermoplastic aligner forms a mechanical and/or adhesive bond upon cross linking of the gel by curing of the gel and interconnecting with the textured surface portion.

11. A teeth aligner system according to claim 1, wherein a curved shaping and configuration of the removable thermoplastic aligner aids frictional attachment to the teeth.

12. A teeth aligner system according to claim 1, wherein the gel layer composition of the invention provides a differential adhesion strength between a first interface formed between a textured surface of the removable thermoplastic aligner and the gel layer, and a second interface between the gel layer and the patient's teeth.

13. A teeth aligner system according to claim 1, wherein the removable thermoplastic aligner is formed of a plastic material so as to enhance an effective differential adhesion bond strength of a first interface formed between the thermoplastic aligner aligner and the oral adhesive so as to be greater than a second interface between the oral adhesive and the patient's teeth wherein the aligner is more readily removed with the oral adhesive from the patient's teeth.

14. A teeth aligner system according to claim 1, wherein an effective differential adhesion bond strength is such that a first interface formed between the aligner and the transparent force transfer layer is greater than a second interface between the oral adhesive and the patient's teeth wherein the aligner is more readily removed with the gel layer from the patient's teeth.

15. A teeth aligner system according to claim 1, wherein an effective differential adhesion bond strength is provided by scoring the textured portion of the teeth contacting surface of the removable thermoplastic aligner to increase the adhesive bond of first interface of the gel layer to the removable thermoplastic aligner and enable the lesser bond strength at the second interface between the gel layer and the patient's teeth allowing the aligner to be fitted to and effective for realignment of teeth, and removed from teeth without damaging teeth enamel.

16. A teeth aligner system according to claim 1, wherein the gel layer is formed from a polysiloxane selected from compounds having the general formula below:

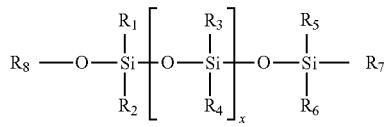

wherein R1, R2 and R5 and R6 can be an alkyl group or a phenyl group;
wherein R3 and R4 can be selected from alkyl groups and vinyl groups; and
wherein R7 and R8 can be selected from alkyl groups and vinyl groups.

17. A teeth aligner system according to claim 1, wherein the gel layer further includes a range of agents selected from calcium salts, bioactive glass, antibacterials, probacterials, and wherein said one or more of selected agents is dispersed in the polysiloxane matrix and able to diffuse through the matrix for absorption.

18. A teeth aligner system according to claim 1 further including an applicator for providing a constant thickness layer of gel over the teeth aligning surface formed as the inner surface of the teeth receiving cavity.

19. A teeth aligner system providing orthodontic tooth movement (OTM) for use in assisting corrective realignment of a patient's teeth, the aligner system including:
  a. a removable thermoplastic aligner having a teeth receiving cavity with a teeth aligning surface formed as an inner surface of the teeth receiving cavity;
  b. a transparent force transfer layer formed on the teeth aligning surface comprising a curable gel engaging between the teeth aligning surface and the patient's teeth, enabling a separation and spacing of the aligner from the teeth while providing a force transfer mechanism from the removable thermoplastic aligner to the teeth when in located in a required OTM fitting position on the teeth of the patient to provide an effective OTM force on the teeth:
  c. wherein the curable gel and the thermoplastic of the aligner are selected to provide a comparative difference of adhesion bond between the cured gel and thermoplastic aligner and the cured gel and the patient's teeth allowing ready removal of the aligner without damage to the teeth and ready repositioning to the OTM fitting position;
  d. an applicator for providing a constant thickness layer of gel over the teeth aligning surface formed as the inner surface of the teeth receiving cavity; and
  e. a heat generating system for providing heat source to increase to the heat affected gel curing rate.

20. A teeth aligner system according to claim 19 wherein the heat generating system is incorporated in the applicator.

21. A teeth aligner system providing orthodontic tooth movement (OTM) for use in assisting corrective realignment of a patient's teeth, the aligner system including:
  a. a removable thermoplastic aligner having a teeth receiving cavity with a teeth aligning surface formed as an inner surface of the teeth receiving cavity;
  b. a transparent force transfer layer formed on the teeth aligning surface comprising a curable gel engaging between the teeth aligning surface and the patient's teeth, enabling a separation and spacing of the aligner from the teeth while providing a force transfer mechanism from the removable thermoplastic aligner to the teeth when in located in a required OTM fitting position on the teeth of the patient to provide an effective OTM force on the teeth;
  c. wherein the curable gel and the thermoplastic of the aligner are selected to provide a comparative difference of adhesion bond between the cured gel and thermoplastic aligner and the cured gel and the patient's teeth allowing ready removal of the aligner without damage to the teeth and ready repositioning to the OTM fitting position;
  d. an applicator for providing a constant thickness layer of gel over the teeth aligning surface formed as the inner surface of the teeth receiving cavity; and
  wherein the applicator includes a scoring means and a delivery means;
  wherein the scoring means affects a top surface of the aligner to form a textured surface in advance of the gel and wherein the delivery means stores and delivers a quantity of the gel to the inner surface of the teeth receiving cavity.

22. A teeth aligner system according to claim 21 wherein the applicator comprises a sponge tip on or adjacent the delivery end of a barrel, the sponge tip being movable relative to or over the delivery end during egress of the gel composition,
  wherein during delivery of the gel composition onto a surface of the aligner, the sponge tip applies microscopic score lines or textured surface to a surface of the dental straightening device, and
  wherein the scored or textured surface is adapted to allow preferential mechanical adherence of the gel layer to the dental straightening device.

23. A teeth aligner system according to claim 22, wherein the sponge tip is selected from a range of polymeric materials including polyether, polyvinyl alcohol, or polyester, and a collection of bioglass particles.

24. An applicator for applying a textured surface to and delivery of a gel composition to a thermoplastic teeth aligner, the applicator comprising:
  i. a storage compartment for containing the gel composition, and a delivery end, wherein the gel composition includes a polysiloxane and catalyst in a predetermined ratio,
  ii. a sponge tip on or adjacent the delivery end of a barrel, the sponge tip being movable relative to or over the delivery end during egress of the gel composition,
  iii. wherein during delivery of the gel composition onto a surface of the thermoplastic teeth aligner, the sponge tip applies microscopic score lines or textured surface to a surface of the dental straightening device, and
  iv. wherein the scored or textured surface is adapted to allow preferential mechanical adherence of the gel layer to the thermoplastic teeth aligner.

* * * * *

UNITED STATES PATENT AND TRADEMARK OFFICE
CERTIFICATE OF CORRECTION

PATENT NO. : 11,317,991 B2
APPLICATION NO. : 16/321165
DATED : May 3, 2022
INVENTOR(S) : Eugene Chan et al.

It is certified that error appears in the above-identified patent and that said Letters Patent is hereby corrected as shown below:

In the Claims

Column 35, Claim 1, Line 31 currently reads "teeth when in located in a required OTM fitting position" and should correctly read --teeth when located in a required OTM fitting position--

Column 36, Claim 13, Line 51 currently reads "moplastic aligner aligner and the oral adhesive so as to be" and should correctly read --moplastic aligner and the oral adhesive so as to be--

Column 38, Claim 21, Line 10 currently reads "teeth when in located in a required OTM fitting position" and should correctly read --teeth when located in a required OTM fitting position--

Signed and Sealed this
Second Day of August, 2022

Katherine Kelly Vidal
*Director of the United States Patent and Trademark Office*